US012804616B2

(12) United States Patent
Singh et al.

(10) Patent No.: US 12,804,616 B2
(45) Date of Patent: Nov. 17, 2026

(54) COMMUNICATION LINKS ALLOCATION AND SLICING OF RECONFIGURABLE INTELLIGENT SURFACE USING MODULAR HARDWARE FOR FLEXIBLE WIRELESS NETWORK

(71) Applicant: Dell Products L.P., Round Rock, TX (US)

(72) Inventors: Tejinder Singh, Manotick (CA); Navjot Kaur Khaira, Manotick (CA); Yongxia Lyu, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 18/795,003

(22) Filed: Aug. 5, 2024

(65) Prior Publication Data

US 2026/0040278 A1 Feb. 5, 2026

(51) Int. Cl.
*H04W 72/04* (2023.01)

(52) U.S. Cl.
CPC .................................. *H04W 72/04* (2013.01)

(58) Field of Classification Search
CPC .......................... H04W 72/04; H04B 7/04013
See application file for complete search history.

(56) References Cited

U.S. PATENT DOCUMENTS 9,852,079 B2 * 12/2017 Kepner ............... G06F 12/0897
12,512,879 B2 * 12/2025 Bai .................... H04B 7/04013

(Continued)

FOREIGN PATENT DOCUMENTS

CN 115334521 A 11/2022
EP 3 729 038 B1 4/2025

(Continued)

OTHER PUBLICATIONS

Y. Zhuang, J. Cappos, T.S. Rappaport et al., "Future Internet bandwidth trends: An investigation on current and future disruptive technologies", Secure Systems Lab, Dept. Comput. Sci. Eng., Polytech. Inst. New York Univ., New York, NY, USA, Tech. Rep. TR-CSE-2013-04, Nov. 1, 2013. 27 pages.

(Continued)

*Primary Examiner* — Faruk Hamza
(74) *Attorney, Agent, or Firm* — Amin, Turocy & Watson, LLP

(57) ABSTRACT

The technology described herein is directed towards subdividing a reconfigurable intelligent surface (RIS) into rectangular portions of subarrays of unit cells, which can be magnetically coupled subarray modules, for different functions/operations. The subdividing can be dynamic, such as based on different performance-based allocations, and each portion can have a separate directivity and/or array gain. Control signal data from a base station or user equipment instructs a tile controller for the RIS to change the respective numbers of unit cells for the various respective functions/operations, which can include a receive-and-forward function from the base station via the RIS to user equipment, and a receive-and-forward function from the user equipment via the RIS to the base station. There can be one subarray for receiving control information at the RIS from the base station, and one subarray for transmitting control information from the RIS back to the base station.

20 Claims, 20 Drawing Sheets

(56) References Cited

U.S. PATENT DOCUMENTS

| | | | | |
|---|---|---|---|---|
| 12,609,732 | B2 * | 4/2026 | Sahraei | H04B 7/04013 |
| 2017/0084306 | A1 | 3/2017 | Xia et al. | |
| 2021/0232240 | A1 | 7/2021 | Smith | |
| 2022/0377730 | A1 * | 11/2022 | Yang | H04W 52/36 |
| 2023/0129288 | A1 | 4/2023 | Sun et al. | |
| 2023/0209642 | A1 | 6/2023 | Jiang et al. | |
| 2023/0216572 | A1 * | 7/2023 | Elshafie | H04B 7/04026 375/267 |
| 2023/0258759 | A1 | 8/2023 | Wang et al. | |
| 2023/0268650 | A1 | 8/2023 | Swartz et al. | |
| 2023/0361816 | A1 | 11/2023 | Yang et al. | |
| 2023/0370958 | A1 | 11/2023 | Gunzelmann et al. | |
| 2024/0056129 | A1 * | 2/2024 | Duan | H04B 7/04013 |
| 2024/0097743 | A1 | 3/2024 | Bhamri et al. | |
| 2024/0337722 | A1 | 10/2024 | Shrivastava et al. | |
| 2024/0364434 | A1 * | 10/2024 | Sahraei | H04B 17/309 |
| 2024/0365152 | A1 * | 10/2024 | Elshafie | H04L 25/0254 |
| 2024/0380438 | A1 * | 11/2024 | Elshafie | H04W 52/0235 |
| 2024/0413868 | A1 | 12/2024 | Haghighat et al. | |
| 2025/0138179 | A1 * | 5/2025 | Fakhreddine | G08G 5/26 |
| 2025/0150118 | A1 * | 5/2025 | Ali | H04B 17/345 |
| 2025/0202563 | A1 * | 6/2025 | Elshafie | H04B 7/0695 |
| 2025/0323689 | A1 | 10/2025 | Jagyasi et al. | |
| 2026/0012227 | A1 * | 1/2026 | Albanese | H04B 7/04013 |
| 2026/0025168 | A1 * | 1/2026 | Huang | H04B 7/04013 |
| 2026/0088856 | A1 * | 3/2026 | Hemadeh | H04B 7/04013 |
| 2026/0113077 | A1 * | 4/2026 | Huang | H04B 7/04013 |
| 2026/0121692 | A1 * | 4/2026 | Huang | H04B 7/04013 |
| 2026/0142691 | A1 * | 5/2026 | Prasad | H04B 7/04013 |
| 2026/0149487 | A1 * | 5/2026 | Noh | H04B 7/04013 |
| 2026/0163609 | A1 * | 6/2026 | Sahraei | H04B 7/04013 |
| 2026/0180624 | A1 * | 6/2026 | Bae | H04B 7/04013 |

FOREIGN PATENT DOCUMENTS

| | | | |
|---|---|---|---|
| JP | 2011-130329 | A | 6/2011 |
| KR | 10-2022-0125294 | A | 9/2022 |
| WO | 2023/161428 | | 8/2023 |
| WO | 2023/230300 | A1 | 11/2023 |
| WO | 2024/125781 | A1 | 6/2024 |

OTHER PUBLICATIONS

M. Poulakis, "Metamaterials Could Solve One of 6G's Big Problems [Industry View]," in Proceedings of the IEEE, vol. 110, No. 9, pp. 1151-1158, Sep. 2022. 8 pages.

L. Subrt and P. Pechac, "Controlling Propagation Environments Using Intelligent Walls," Subrt, L., & Pechac, P. (2012). Controlling propagation environments using Intelligent Walls. 2012 6th European Conference on Antennas and Propagation (EUCAP). doi:10.1109/eucap.2012.620651. 2012. 5 pages.

N. Kaina, M. Dupre, G. Lerosey, and M. Fink, "Shaping complex microwave fields in reverberating media with binary tunable metasurfaces," Scientific Reports, vol. 4, pp. 1-7, Published: Oct. 21, 2014. 8 pages.

L. Dai, B. Wang, M. Wang et. al., "Reconfigurable Intelligent Surface- Based Wireless Communications: Antenna Design, Prototyping, and Experimental Results," in IEEE Access, vol. 8, pp. 45913-45923, Mar. 2, 2020. 11 pages.

Caner Guclu, Julien Perruisseau-Carrier, and Ozlem Aydin Civi. "Proof of Concept of a Dual-Band Circularly-Polarized RF MEMS Beam-Switching Reflectarray" IEEE Transactions on Antennas and Propagation, vol. 60, No. 11, Nov. 2012, 5 pages.

Khaira, et al. "Remote Controlled Reconfigurable Intelligent Surface With Modular Scalable Design for Flexible Radio Coverage With Adjustable Signal Strength", U.S. Appl. No. 18/536,565, filed Dec. 12, 2023, 53 pages.

Khaira, et al. "Remote Controlled Reconfigurable Intelligent Surface", U.S. Appl. No. 18/640,596, filed Apr. 19, 2024, 37 pages.

ETSI GR RIS 001 V1.1.1, "Reconfigurable intelligent surfaces (RIS); Use); Use Cases, Deployment Scenarios and Requirements" Apr. 2023, 29 pages.

ETSI GR RIS 002 V1.1.1, "Reconfigurable intelligent surfaces (RIS); Technological challenges, architecture, and impact on standardization" Aug. 2023, 33 pages.

ETSI GR RIS 003 V1.1.1, "Reconfigurable intelligent surfaces (RIS); Communication Models, Channel Models, Channel estimation and Evaluation Methodology" Jun. 2023, 59 pages.

Invitation to Pay Additional Fees for PCT Application No. PCT/US2024/013740 mailed Sep. 17, 2024, 11 pages.

Lyu et al. "Reconfigurable Intelligent Surface-Assisted Flexible Wireless Network" U.S. Appl. No. 18/758,036, filed Jun. 28, 2024, 36 pages.

Non-Final Office Action received for U.S. Appl. No. 18/536,565 dated Feb. 3, 2026, 17 pages.

Non-Final Office Action received for U.S. Appl. No. 18/758,036 dated Nov. 21, 2025, 17 pages.

International Search Report and Written Opinion mailed Jan. 24, 2025 for PCT Application No. PCT/US2024/013740, 24 pages.

Sayanskiy Andrey et al: "A 2D-Programmable and Scalable Reconfigurable Intelligent Surface Remotely Controlled via Digital Infrared Code", IEEE Transactions on Antennas and Propagation, vol . 71, No. 1, Jan. 2023, 11 pages.

Kisseleff Steven et al: "Reconfigurable Intelligent Surfaces in Challenging Environments: Underwater, Underground, Industrial and Disaster", IEEE Access, Special Section on Reconfigurable Intelligent Surgace Aided Communications for 6G and Beyond, vol. 9, Nov. 2021, 20 pages.

Notice of Allowance received for U.S. Appl. No. 18/640,596 dated Apr. 21, 2026, 9 pages.

Liaskos et al., "End-to-End Wireless Path Deployment with Intelligent Surfaces Using Interpretable Neural Networks", In IEEE Transactions on Communications, vol. 68, No. 11, Nov. 2020, pp. 6792-6806.

Final Office Action received for U.S. Appl. No. 18/758,036 dated Mar. 2, 2026, 17 pages.

Notice of Allowance received for U.S. Appl. No. 18/536,565 dated Apr. 14, 2026, 7 pages.

Notification Concerning Transmittal of International Preliminary Report on Patentability for PCT Application No. PCT/US2024/013740 dated Jun. 25, 2026, 15 pages.

Notice of Allowance received for U.S. Appl. No. 18/758,036 dated Jun. 16, 2026, 10 pages.

* cited by examiner

COMMUNICATION LINKS ALLOCATION AND SLICING OF RECONFIGURABLE INTELLIGENT SURFACE USING MODULAR HARDWARE FOR FLEXIBLE WIRELESS NETWORK

BACKGROUND

Reconfigurable intelligent surfaces (alternatively referred to as intelligent reflective surfaces, or metasurfaces) are manmade thin reflective or refractive surfaces whose electromagnetic response can be electronically controlled. Reconfigurable intelligent surfaces are characterized by their two-dimensional arrays of electronically controllable reflecting elements, referred to as unit cells, that can dynamically manipulate electromagnetic waves by altering attributes such as phase, amplitude, and direction of a redirected incoming signal. These elements have dynamically controllable properties, facilitated through control signaling, enabling the manipulation of incident wireless signals via reflection, refraction, focusing, collimation, modulation, absorption, or a combination thereof.

In practical mobile communication systems, the uneven coverage of wireless signals, often resulting from obstacles such as buildings, trees, vehicles, and other mobile entities, can lead to instances of weak coverage. Strategic deployment of a reconfigurable intelligent surface offers a cost-effective and readily-implementable solution to an otherwise weak coverage area by establishing clear line-of-sight propagation paths between an access point, the reconfigurable intelligent surface, and terminals (including user equipment) within the weak coverage area, thereby enhancing overall coverage.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
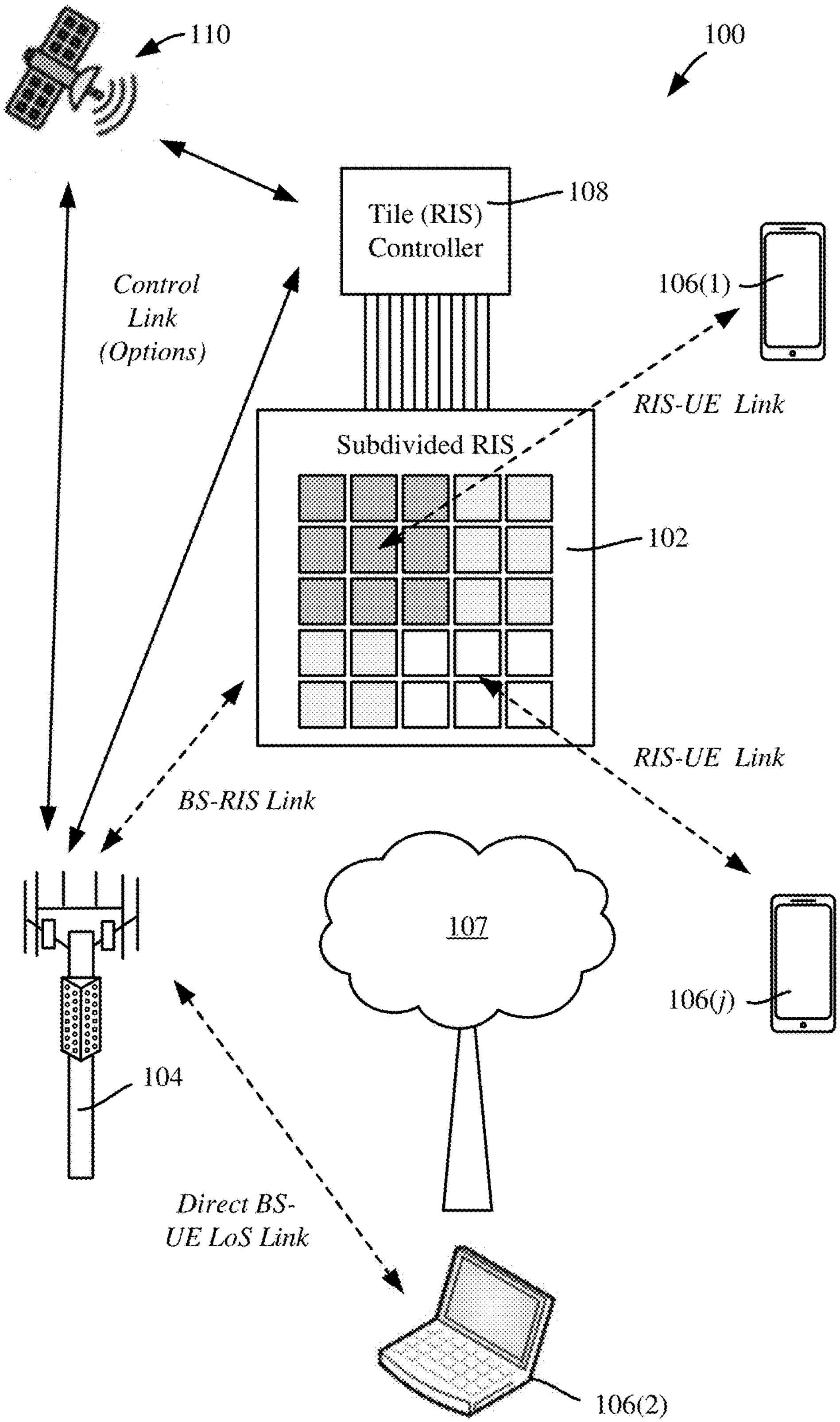
FIG. 1 is a block diagram showing an example system in which a reconfigurable intelligent surface is subdivided into portions (segments/slices) of unit cell subarray groupings, in accordance with various example embodiments and implementations of the subject disclosure.

The technology described herein is generally directed towards reconfigurable intelligent surface slicing in which a reconfigurable intelligent surface (RIS) can be subdivided into two-dimensional portions (alternatively referred to as "segments" or functionally different slices) of unit cells, including unit cells arranged as subarrays (e.g., modules) for different functions/operations, e.g., for different performance-based allocation. The allocation of the reconfigurable intelligent surface into portions facilitates dynamic adjustment of an individual communication link's performance gain, corresponding to a portion of the RIS, in a flexible wireless network. For example, a base station (including any type of access point) can send control signal data that instructs a controller of the reconfigurable intelligent surface to change the respective numbers of unit cells/unit cell subarrays for various respective functions/operations. In this way, for example, reconfigurable intelligent surface processing gain for one otherwise weak communications link can be increased by having an increased number of unit cells allocated for that link to improve the gain with respect to that link. The respective allocated portions for respective links can be reconfigured dynamically as deemed appropriate, e.g., based on current environmental conditions, for example.

In one implementation, a modular hardware design is described to implement the dynamic slicing of the communication links. An example hardware implementation using subarrays of unit cells arranged as modules, provides a modular design that facilitates dynamic slicing of the RIS panel into the portions (segments) for performance-based allocation.

As will be understood, such dynamic slicing of the reconfigurable intelligent surface panel into portions for performance-based allocation can be based on a control signal received by a controller (e.g., a tile controller for the RIS) coupled to the reconfigurable intelligent surface's unit cells. In one implementation, the control signal can include unit cells' allocation information, e.g., for one portion to operate as a receive-and-forward link, that is, cells that receive a radio frequency (RF) signal from the base station, and transmit/forward the RF signal to user equipment (UE or UEs). Similarly, a portion (the same or a different portion) can be configured as a receive-and-forward link that receives an RF signal from a UE and forwards the RF signal to the base station. There can be one receiver portion that receives an RF signal from the base station, e.g., for control information communications to the reconfigurable intelligent surface's controller. Similarly, there can be one transmitter portion utilized for transmitting signals from the reconfigurable intelligent surface's controller to the base station. Alternatively, the receiver and transmitter links can share the same subarray of unit cells, at one time acting as a receiver, and another time acting as a transmitter.

In one example implementation, the reconfigurable intelligent surface controller can report the maximum number of unit cells/RIS elements to the base station, (in which the unit cells can be arranged within subarrays of j×k unit cell groupings), or as a reported capability of the reconfigurable intelligent surface; note that the controller can report the maximum number of subarrays along with the dimensions of the subarrays (unless already known to the base station). The reconfigurable intelligent surface controller can report back a maximum number of unit cells (or subarrays of unit cells) in each portion after allocation of a certain portion of the unit cells for certain links; one portion can be used for the base station-to-reconfigurable intelligent surface control link; another portion can be allocated to be used as a reconfigurable intelligent surface-to-base station backhaul link, and another for a reconfigurable intelligent surface-to-UE link, for example. The information can indicate time slot allocation for associated unit cells allocated for one receive-and-forward portion and another receive-and-forward portion, and/or for receiver and transmitter portions. The information can indicate frequency domain allocation for associated unit cells allocated for one receive-and-forward portion and another receive-and-forward portion, and/or for receiver and transmitter portions.

In order to provide reconfigurability in the direction of a reflected signal, the reflected elements are able to switch between multiple reflection phases, which is achieved by the use of a tunable capacitor (varactor) in each element, which tunes the reflection phase by switching between an element's different capacitance states. In one example implementation, the subdivisible reconfigurable intelligent surface is based on a modular design that is formed via interconnectable modules of unit cells (elements), which facilitates straightforward assembly and scalability with respect to a reconfigurable intelligent surface. Modularity is achieved by separate j×k (e.g., 3×3) element subarray modules, which can be interconnected (tiled together) and which are centrally managed by a primary controller. The controller directs microcontrollers in each module to fine-tune the voltage to the varactors, subsequently changing the reconfigurable intelligent surface phase profile.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a reconfigurable intelligent surface (RIS) 102 capable of being subdivided into different portions of unit cells, in which individual unit cells, or alternatively subarrays of j×k (e.g., 3×3) unit cell groupings, are represented as squares within the reconfigurable intelligent surface 102. As described herein, in one implementation the different individual unit cells or different subarrays of unit cell groupings are logically combined into rectangular portions (shown differently shaded from one another) that do not intersect with one another. A base station 104, or access point, which can be a gNodeB (gNB), 6G RAN node, O-RAN architecture total radiated power (TRP) of gNB, (hereinafter referred to as a base station in a wireless network) communicates with user equipment (UE) 106(1)-106(*j*). The communications can be direct line of sight (LoS) between the base station 104 and a user equipment (e.g., 106(2)), or via the subdivided reconfigurable intelligent surface 102. Although not explicitly shown in FIG. 1, any of the user equipment can be mobile or fixed, and there can be more than one reconfigurable intelligent surface in the communications link between the base station and a user equipment.

In general, and as represented in FIG. 1, each wireless link can go through a time-varying wireless channel with potential scatters, moving and/or fixed obstacles (e.g., 107), as well as unwanted interference from other reconfigurable intelligent surface(s) or neighbor base station(s). As such, a strategically located reconfigurable intelligent surface 102 can redirect the signals to and from the base station 104 and the user equipment (UE) 106(1)-106(*j*) around any obstacle and/or to help mitigate interference. Moreover, the reconfigurable intelligent surface 102 can be configured to alter characteristics of the reflected instance of the incoming signal, such as to provide constructive interference by which targeted user equipment (one or more UEs) benefits from array gain in a certain direction/at a certain distance, even without active amplification.

A tile controller 108 for the RIS (and possibly at least one other RIS) can alter the individual unit cells' phases, for example, to change the redirected/retransmitted signal instance. For example, the base station 104 can send control data to the RIS controller 108 as described herein, whereby the RIS controller 108 can dynamically change the properties of the individual unit cells. In particular, the properties can be dynamically changed per unit cell in each subarray of unit cells, and thus in each portion of (one or more) subarrays as described herein, such as to different portions perform different functions/operations. For example, respective subdivided portions can be dynamically increased or decreased in size with respect to their respective total number of subarrays/unit cells. Note that the base station 104 can communicate the control data directly through part of the RIS surface, directly through a wired or other wireless link, or alternatively indirectly through an intermediary (e.g., the satellite 110); this can depend on where the RIS is deployed, e.g., nearby where a wired connection is feasible, or remote whereby a wireless link is advantageous. Note that there can be more than one intermediary between a reconfigurable intelligent surface and the base station, and indeed, multiple reconfigurable intelligent surfaces may be present as part of any communication link.

To summarize, the unit cells of the reconfigurable intelligent surface have the capability to change at least one of the properties of the incident electromagnetic (EM)/radio frequency (RF) waves, including frequency, amplitude, phase, and/or polarization. The radio wave can be at least redirected or retransmitted towards another direction, such as after reflecting off of (or being refracted by) the reconfigurable intelligent surface, depending on the design of reconfigurable intelligent surface 102. The tile (RIS) controller 108 refers to the reconfigurable intelligent surface component that is responsible for reconfiguring the reconfigurable intelligent surface elements to achieve a desirable way of manipulation of the incident radio wave, potentially processing any signaling received from another network node. In practice, the tile controller 108 provides distribution of the actuation signals to each of the unit cells, e.g., to a varactor or other variable tuning device of the unit cell which alters its phase based on applied bias control voltage; note that there can be a tile controller 108, as well as a microcontroller per each subarray (module) of unit cell groupings. Inside a reconfigurable intelligent surface, one interface is the interface between the tile controller 108 and the reconfigurable intelligent surface 102 unit cells (or unit cell subarrays/modules, e.g., via their microcontrollers) to transmit the control signals.

Figure 2:
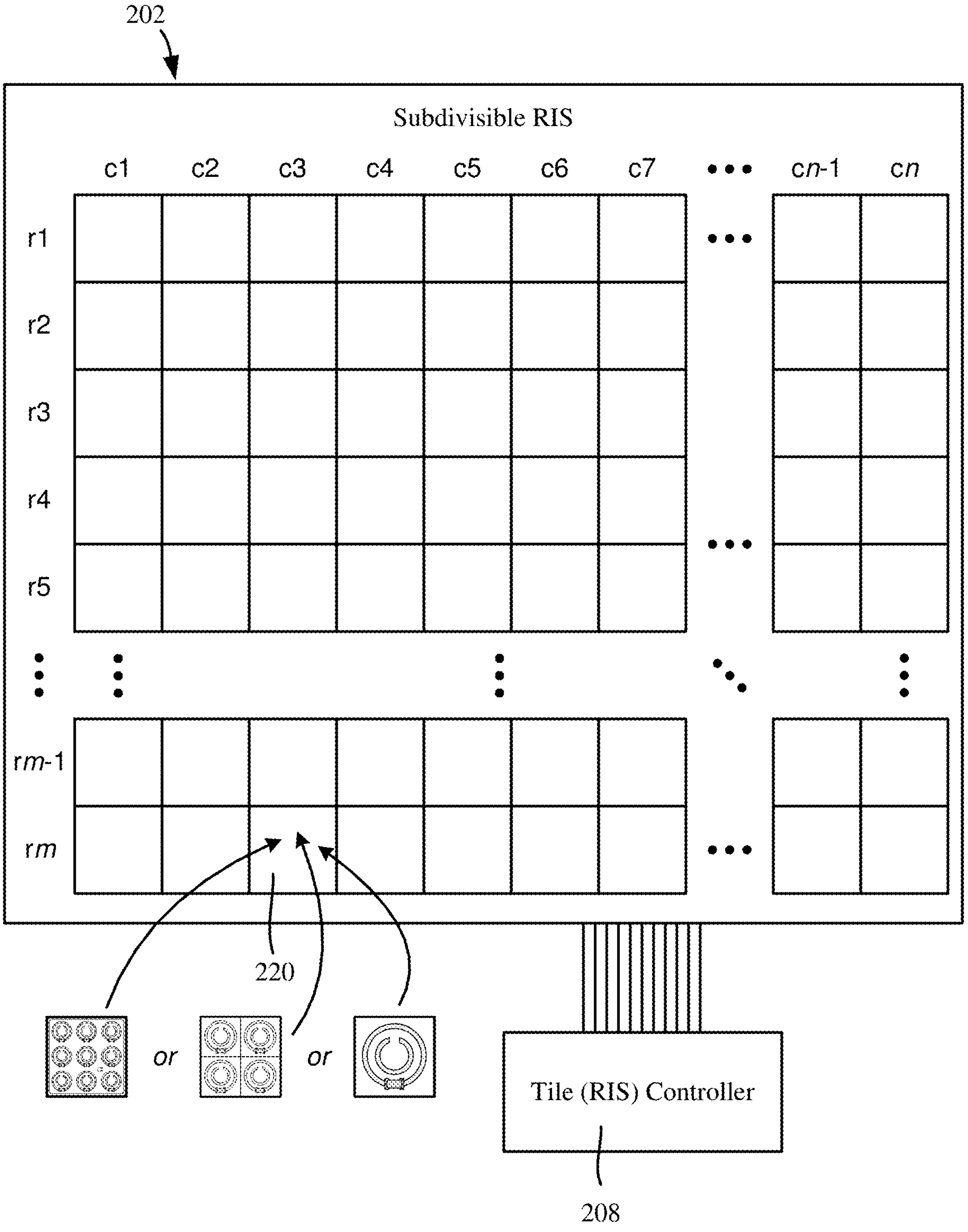
FIG. 2 is a top view representation of an example reconfigurable intelligent surface (RIS) capable of being divided by a RIS controller into portions of subarrays of unit cell groupings, in accordance with various example embodiments and implementations of the subject disclosure.

As shown in FIG. 2, in general, a generalized reconfigurable intelligent surface panel or simply a reconfigurable intelligent surface 202 includes a certain number of elements or unit cells (represented as squares) distributed in rows (r1, r2, r3, . . . , rm−2, rm−1, rm) and columns (c1, c2, c3, . . . , cn−2, cn−1, cn). Note that the squares can represent subarrays of j×k unit cell groupings distributed in the rows (r1, r2, 3, . . . , rm−2, rm−1, rm) and the columns (c1, c2, c3, . . . , cn−2, cn−1, cn). One of the unit cell subarrays, or one of the individual unit cells (depending on a given RIS implementation), is labeled 220 in FIG. 2, which in this example can be a single unit cell, a 2×2 subarray of unit cells, a 3×3 subarray of unit cells, and so on. There is thus a reconfigurable intelligent surface 202 with a total size of rm×cn unit cells (or rm×cn×j×k unit cells if each square represents a j×k subarray of unit cells) depicted in FIG. 2, controlled by at least one tile (RIS) controller 208 (corresponding to the tile controller 108 of FIG. 1). For purposes of brevity, and because a j×k subarray of unit cells can represent a single unit cell (j=l and k=1), the portions (i.e., slices) of the reconfigurable intelligent surface are described hereinafter as being composed of subarrays; each such portion includes at least one subarray.

In general, a reconfigurable intelligent surface has a beamforming gain=20 log (number of unit cells); the reconfigurable intelligent surface receiver gain or transmitter gain is thus proportional to the number of unit cells used/activated for a receiver and/or a transmitter in a wireless link. For a given reconfigurable intelligent surface panel, the number of unit-cell(s) used/activated for a base station-reconfigurable intelligent surface link and reconfigurable intelligent surface-UE link can be informed by the base station or the UE to improve weaker coverage between the base station-reconfigurable intelligent surface link and/or the reconfigurable intelligent surface-UE link. For example, when the base station knows that the base station-to-reconfigurable intelligent surface link is a weaker coverage link between the base station-reconfigurable intelligent surface link and the reconfigurable intelligent surface-UE link, e.g., based on reported measurement results from the reconfigurable intelligent surface, the base station can inform the reconfigurable intelligent surface to use a greater number of unit cells for the base station-reconfigurable intelligent surface link, and use a lesser number of unit cells for reconfigurable intelligent surface-UE link, as per a straightforward computation of unit cells.

Figure 3:
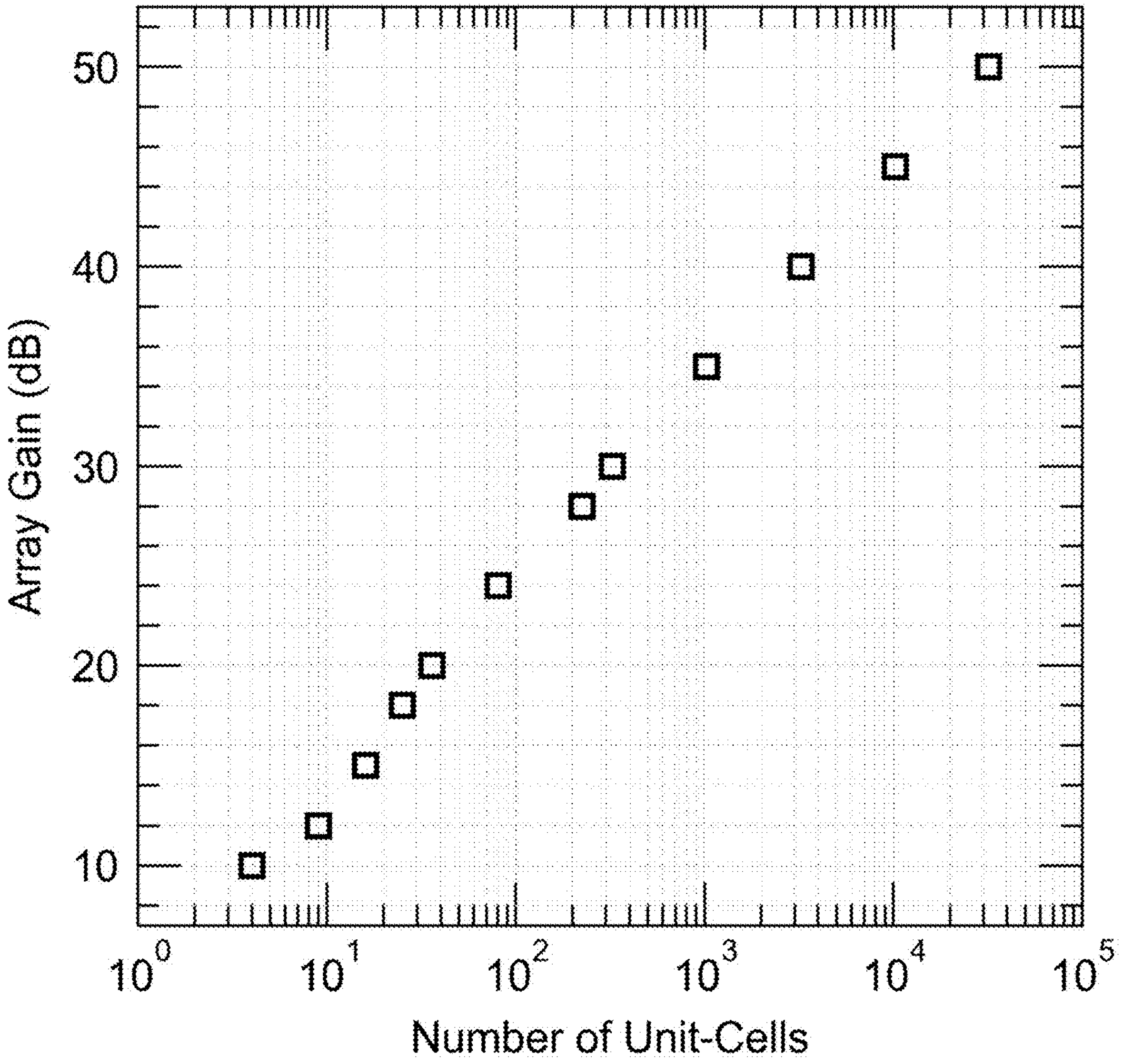
FIG. 3 is an example graphical representation of a total number of unit cells of a RIS needed to achieve specific array gain, in accordance with various example embodiments and implementations of the subject disclosure.

Because as described herein the information about the total number of available subarrays and dimensions of unit cells is given to (or previously known to) the base station, the control link can optimize the ratio or slicing of the reconfigurable intelligent surface appropriately, as the array gain is independent of the frequency, and depends only on the number of unit cells used. For example, FIG. 3 shows the total number of unit-cells (note that the x-axis is plotted using a log scale) needed to achieve a specific array gain, in dB, which is independent of the frequency of operation. As can be readily appreciated, the gain based on the total number of unit cells can be for an entire RIS, or for a smaller allocated portion of unit cell subarray(s). Note that once a reconfigurable intelligent surface is deployed, the size of reconfigurable intelligent surface panel is fixed; in other words, the maximum number of unit-cell/reconfigurable intelligent surface elements in the reconfigurable intelligent surface panel are fixed, which can be known in advance to the base station. If not known or varied for some reason (e.g., some unit cells are detected as bad) the RIS can report the total number of unit cells/RIS elements to a BS as a capability of the RIS. Alternatively, or in addition to the total number of unit cells, for a RIS composed of subarrays, the RIS can report the total number of subarrays, and if needed/not known to the base station, the size (e.g., 3×3, or nine) of the subarrays.

As described herein, a reconfigurable intelligent surface may be introduced into a communications system because the direct link between the base station and UE, also called a base station-UE link, may be obstructed sufficiently or even completely due to blockage, and/or because the base station-UE link is a weak communication link due to a highly fading propagation environment and cannot be utilized (such as corresponding to a low RSSI (received signal strength indicator) or SINR (signal-to-interference-plus-noise ratio)). A reconfigurable intelligent surface may be introduced into the wireless system to add one more fading paths for the UE to improve spectral efficiency, even when a direct base station-UE link is present.

Any individual link can have the weakest coverage relative to other links, or a dynamically varying coverage "hole" issue, which depends on a real time varying environment. One implementation can fully utilize the reconfigurable intelligent surface for dynamic gain allocation, or alternatively as described herein, can allocate a certain number of unit cell subarrays or a ratio of used/unused subarrays for a specific link. Thus, in another alternative way, the control signal can include the ratio of number of unit-cells/RIS elements/subarrays; for example, for receive-and-forward A, receive-and-forward B, transmitter C, receiver D, the ratio of the number of unit-cells/RIS elements/subarrays can be specified as 4:2:1:1, with the ratio values changed as deemed appropriate as environmental conditions change, for example.

Figure 4:
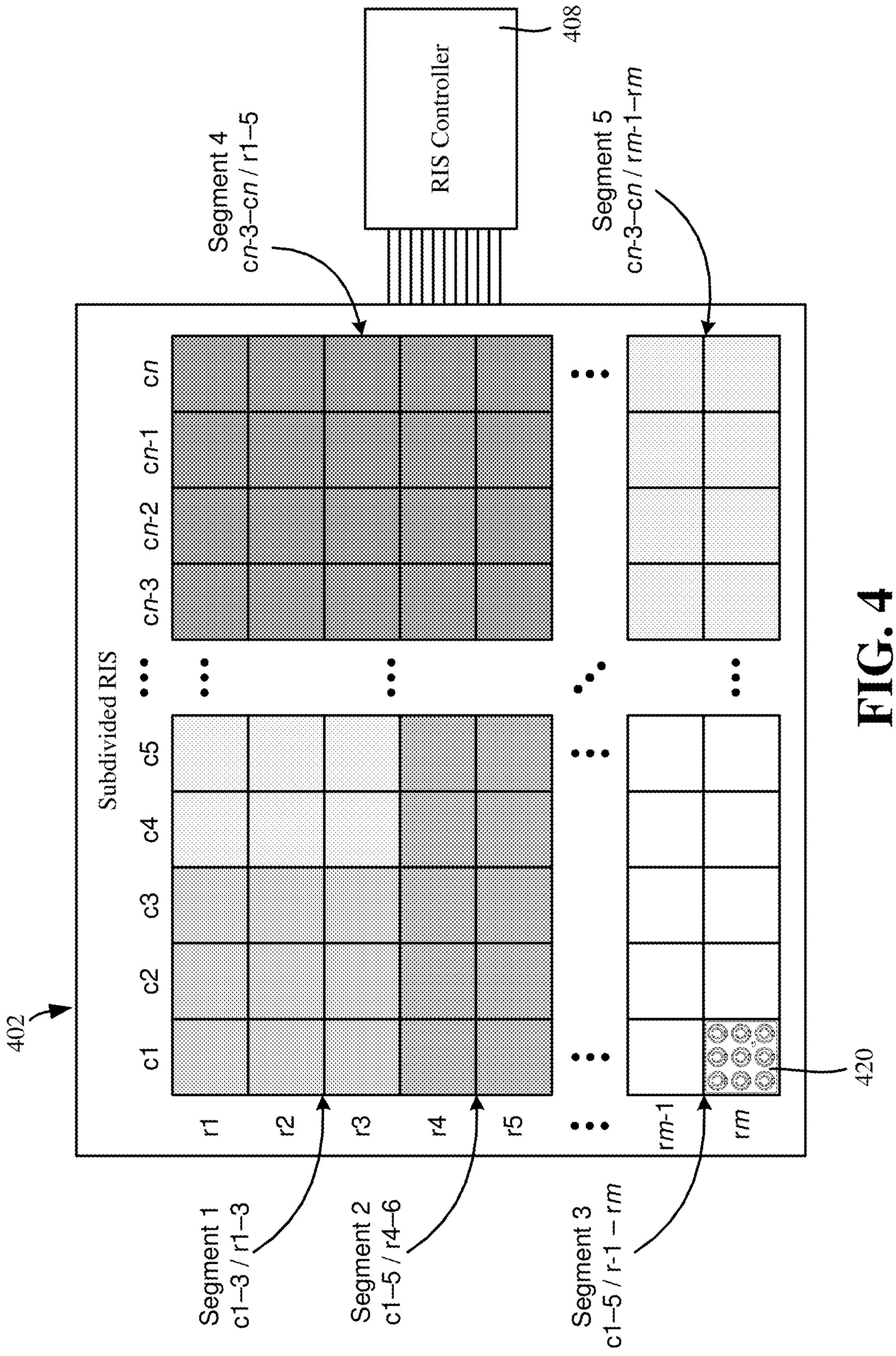
FIG. 4 is a top view representation of an example RIS highlighted with various distributed portions composed of smaller modular subarrays of unit cells, in which each portion can have a separate directivity and/or array gain, in accordance with various example embodiments and implementations of the subject disclosure.

One example distribution or slicing of a subdivided reconfigurable intelligent surface panel to achieve dynamic array gain is shown in FIG. 4, where portions can be formed in the subdivided reconfigurable intelligent surface 402, with each portion including a certain number of subarrays of unit cells (column-wise and/or row-wise). One of the subarrays is labeled 420 in FIG. 4, and while a 3×3 subarray is shown in this example, any j×k subarray can be used, where to reiterate, j>=1, k>=1, and typically j=k. The various portions in FIG. 4 of the reconfigurable intelligent surface highlight the distribution of the smaller subarrays of unit cells, in which each portion can have a separate directivity and/or array gain.

As shown in FIG. 4, a portion "Segment 1" is formed using subarrays c1-3 and r1-3, totaling 9 subarrays (81 total unit cells in this 3×3 unit cells-per-subarray example), while a separate portion "Segment 2" is formed using subarrays c4-5 and r1-3, totaling 6 subarrays (54 total unit cells in this 3×3 unit cells-per-subarray example). Similarly, to fully utilize the panel, various dynamic portions can be formed by the reconfigurable intelligent surface controller 408 after receiving instructions from the base station, e.g., for any weaker wireless link. In this way, the total number of subarrays in a portion can be used as a performance indicator, or the ratio of the panel can also be used for such. For example, if a reconfigurable intelligent surface 402 has one-hundred total subarrays, and no allocation has been done, then the first Segment 1 portion can be formed anywhere between four percent (4%) up to the 100% of the available unused subarrays; thus the ratio of the Segment 1 portion to the size of the panel can be allocated as anywhere between 4:100 to 100:100. If the Segment 1 portion only needs a certain array gain, such as corresponding to 10% of the panel, then 90% of the panel's subarrays are still unused and can be used towards forming other portions.

Figure 5:
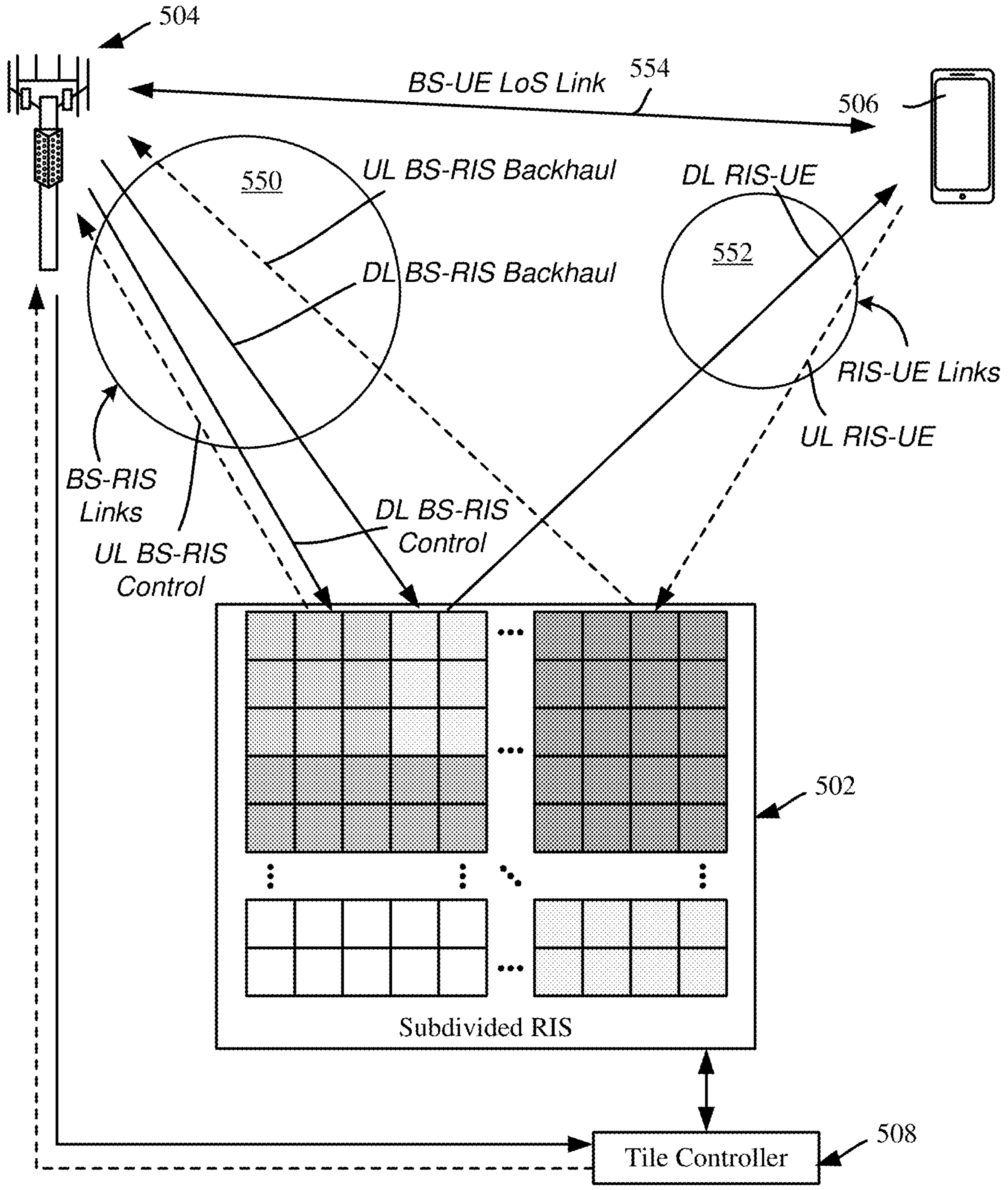
FIG. 5 is a top view representation of one example distribution of the communication links in a RIS-assisted wireless communication system based on a subdivided RIS, in accordance with various example embodiments and implementations of the subject disclosure.

FIG. 5 shows an example of a base station 504 and UE 506 with a subdivided reconfigurable intelligent surface (RIS) 502 deployed in between, in which there is a distribution of the communication links in a reconfigurable intelligent surface-assisted wireless communication system. In general, there are base station-RIS links 550, RIS-UE links 552, and a base station-UE (line-of-sight) link 554.

As shown in FIG. 5, the base station-reconfigurable intelligent surface links 550 can include a base station-RIS control link (for uplink (UL) and downlink (DL) control signal data), and a base station-reconfigurable intelligent surface backhaul link (for uplink and downlink communications data). The base station-reconfigurable intelligent surface control link can be used to exchange control information between the base station and the reconfigurable intelligent surface's controller 508; the control information can be used for the control of the unit cells/subarrays/portions thereof of the reconfigurable intelligent surface 502. The base station-reconfigurable intelligent surface backhaul link and reconfigurable intelligent surface-UE link are allocated to receive-and-forward the uplink and downlink RF signals between the base station and the UE(s). In other words, as the reconfigurable intelligent surface panel receives an RF signal from the base station on the downlink portion of the base station-RIS backhaul link, the reconfigurable intelligent surface forwards the RF signal to the UE on the downlink-allocated portion of the RIS-UE link. When the reconfigurable intelligent surface panel receives an uplink RF signal from UE on the uplink-allocated portion of the RIS-UE link, the reconfigurable intelligent surface panel forwards the signal to the base station on the uplink portion allocated for the base station-RIS backhaul link.

Figure 6:
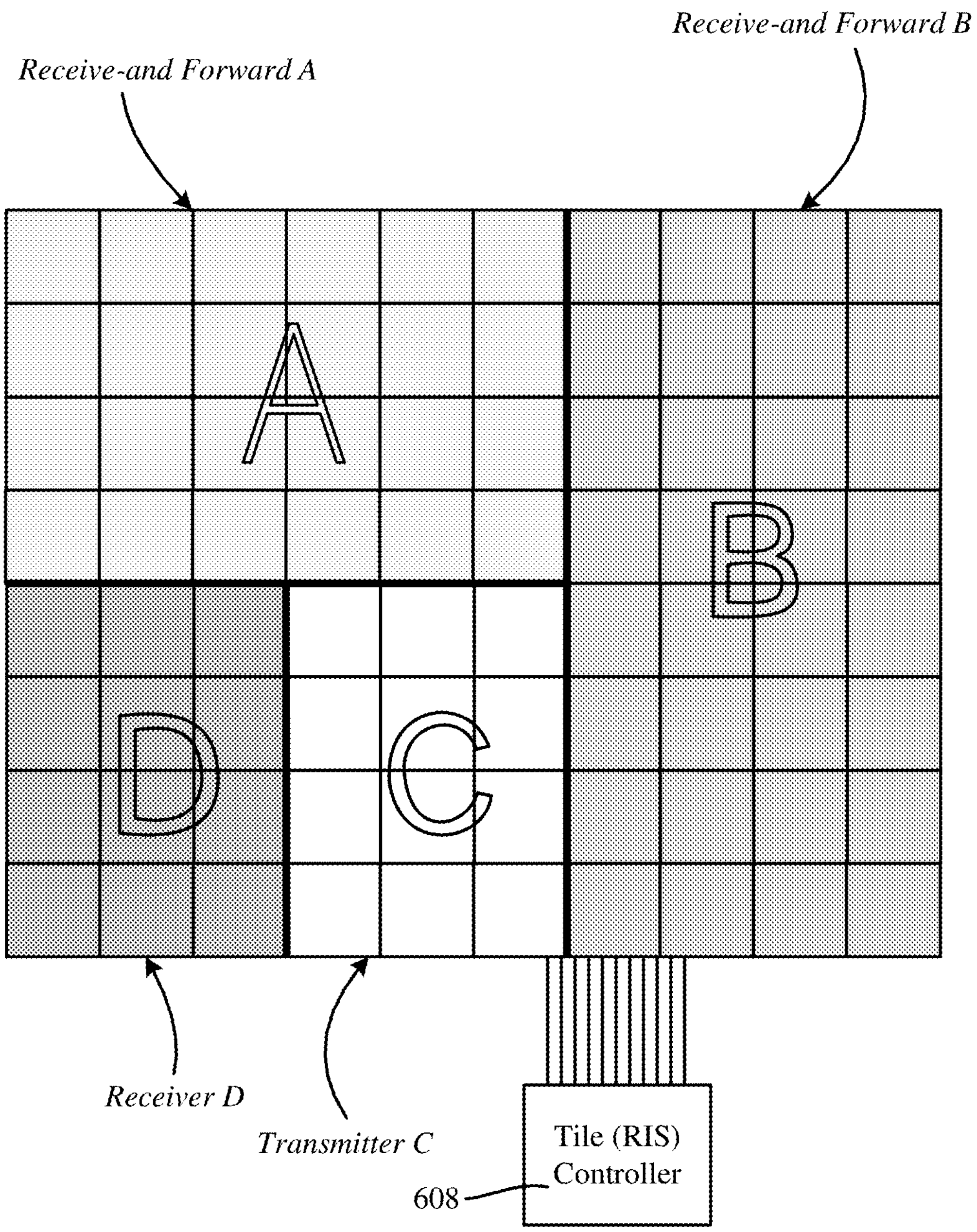
FIG. 6 is a top view representation of an example unit cell subarray allocation with two receive-and-forward portions and remaining subpanels allocated as a transmitter portion and a receiver portion, in accordance with various example embodiments and implementations of the subject disclosure.

FIG. 6 shows another unit cell allocation, with a first receive-and-forward portion, "segment A," a second receive-and-forward portion, "segment B," of a RIS 602. There is also one subarray (segment/subpanel) allocated to operate as a transmitter portion, "segment C", and another allocated to operate as a receiver portion, "segment D". A difference from FIG. 5 is that in FIG. 6, there are separate transmitter (segment C) and receiver (segment D) portions of unit cell subarrays. Thus, the reconfigurable intelligent surface (the tile controller 608) receives control signals from the base station on the downlink portion of the of the base station-reconfigurable intelligent surface's control link (receiver segment D) and transmits control signals to the base station on the uplink portion (transmitter segment C) of the base station-RIS control link. Along with the two receive-and-forward RF signal portions between the base station and UE, the reconfigurable intelligent surface panel in FIG. 6 has four functions, namely receive-and-forward segment A, which receives signal from the base station and transmits/forwards the RF signal to the UE; receive-and-forward segment B, which receives the RF signal from UE and forwards the RF signal to the base station; receiver segment D, which receives the RF signal at the RIS from the base station; and transmitter segment C, which transmits signals from the RIS to the base station. Note that the portion/segment/slice distribution in the dynamic and flexible scheme of FIG. 6 has allocated one-hundred percent of the RIS panel's subarrays of unit cells to enhance the wireless coverage.

Figure 7:
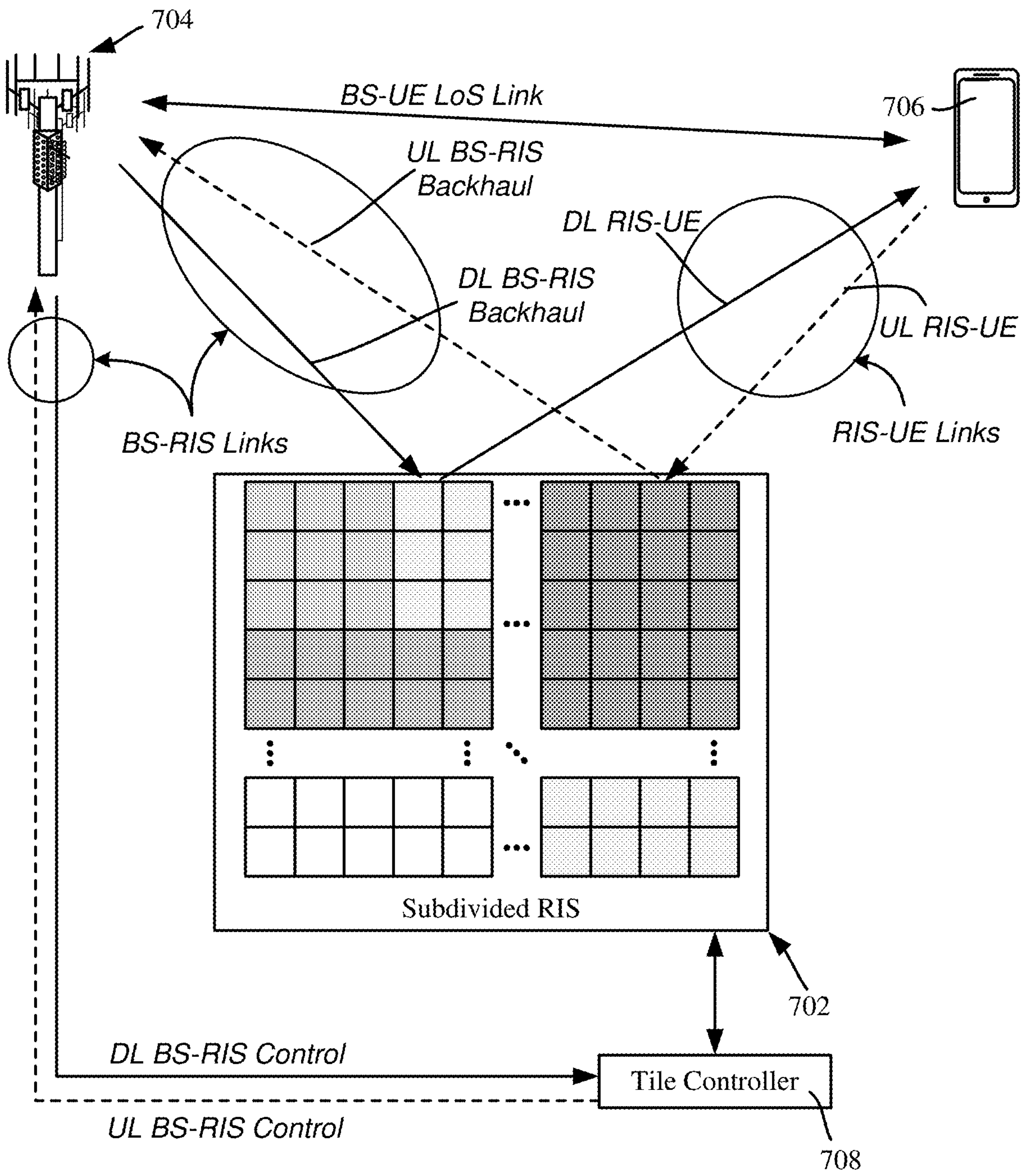
FIG. 7 is a top view representation of another example distribution of the communication links in a RIS-assisted wireless communication system based on a subdivided RIS, in accordance with various example embodiments and implementations of the subject disclosure.

FIG. 7 shows another alternative implementation, in which a tile (RIS) controller 708 is coupled to the base station external to the RIS panel 702. As a result, more subarrays of unit cells are available for non-control portions (segments/functions), particularly larger receive-and-forward portions(s), or receive-and-forward portion(s) that steer redirected signals towards different directions and/or with wider (shorter distance) beams, or narrower (longer distance) beams.

Figure 8:
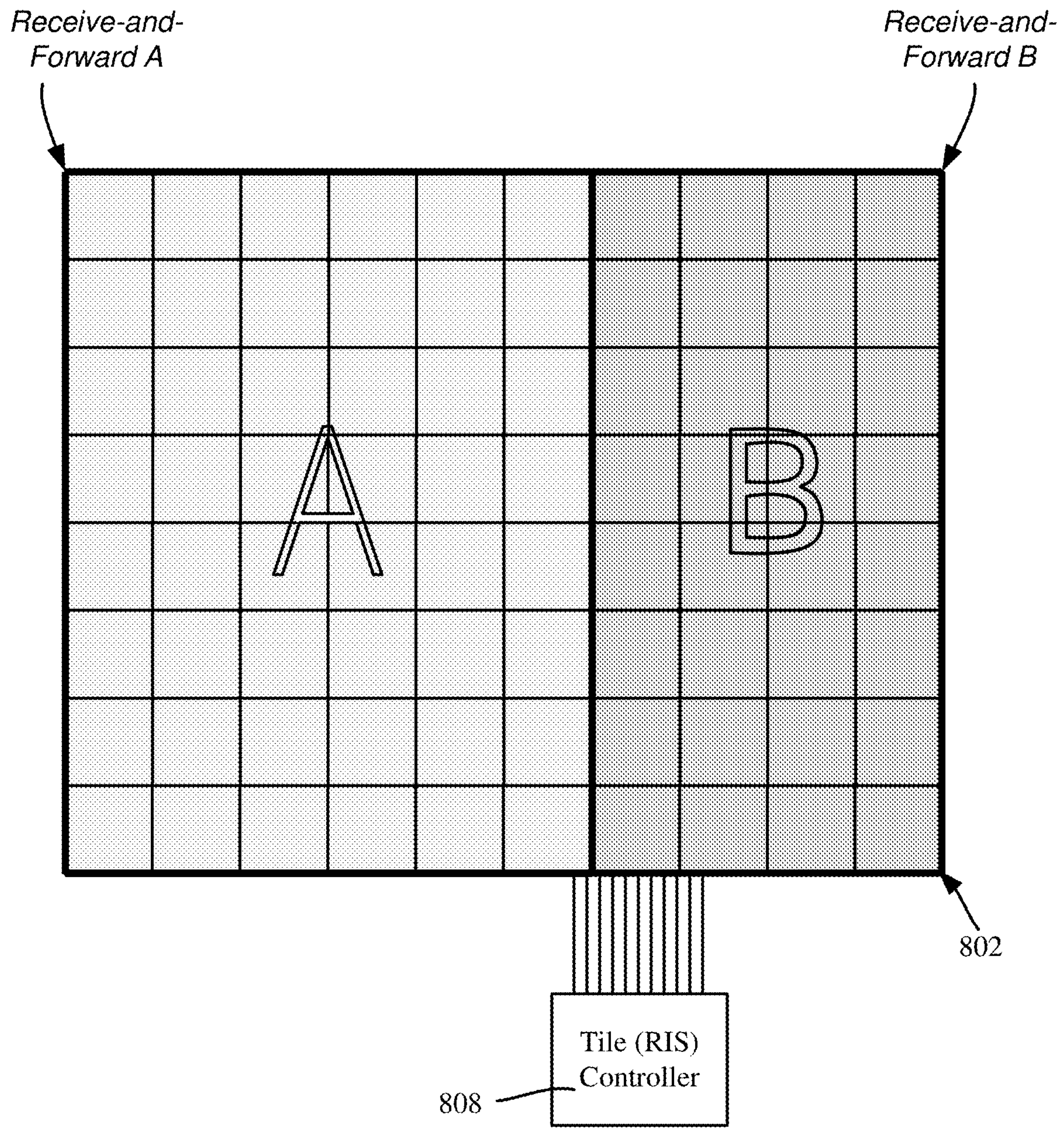
FIG. 8 is a top view representation of yet another example distribution of the communication links in a RIS-assisted wireless communication system based on a subdivided RIS, in accordance with various example embodiments and implementations of the subject disclosure.

For example, if the reconfigurable intelligent surface 702 does not have an allocated transmitter and/or receiver portion (i.e., transmitter segment C and receiver segment D for the BS-reconfigurable intelligent surface control link are optional), as shown in FIG. 7, the reconfigurable intelligent surface does not transmit/receive signals to the BS via a control link, whereby more receive-and-forward subarrays are available. In this case, in order to improve the weaker coverage link between the BS-RIS link and RIS-UE link, the base station can send a control signal to a tile controller 808 to instruct the reconfigurable intelligent surface to change the number of unit cell subarrays for the receive-and-forward portion, segment A, and receive-and-forward portion, segment B, as shown in FIG. 8. Thus, reconfigurable intelligent surface receive-and-forward gain can be increased with an increased number of allocated subarrays of unit cells to improve a weaker link accordingly. For example, when the RIS-UE link is the weaker link compared to the BS-RIS link, and the total number of unit cells in a reconfigurable intelligent surface panel is 900 (100 total subarrays, arranged as 10 subarrays×10 subarrays, each subarray arranged as 9 (3×3) unit cell groupings), the control signal from BS or UE can indicate that number of subarrays for the receive-and-forward segment B is 68 (612 unit cells), and the number of subarrays for the receive-and-forward segment A is 32 (288 unit cells). Different ratios as well as the total number of available subarrays can be used in other circumstances, e.g., depending on environmental conditions that can change the relative strength/weakness of the receive-and-forward links.

To summarize, a reconfigurable intelligent surface capable of being subdivided can be allocated with only receive-and-forward segments, such that the RF signal between the base station and the UE has two functions, as shown in the reconfigurable intelligent surface 802 of FIG. 8. The receive-and-forward portion, segment A, receives the RF signal from the base station, and forwards the RF signal to the UE. In the opposite direction, the receive-and-forward portion, segment B, receives the RF signal from the UE, and forwards the RF signal to the base station.

Returning to FIGS. 5 and 6, if the reconfigurable intelligent surface transmits/receives signal to and from the base station via a RIS control link, it means that the reconfigurable intelligent surface performs the functions of transmitter C and receiver D. In this scenario, in order to improve the weaker coverage links among the BS-RIS control links, the BS-RIS surface backhaul links, and the RIS-UE links, the base station can send a control signal to instruct the reconfigurable intelligent surface to change the number of subarrays of unit cells for the receive-and-forward A, receive-and-forward B, Transmitter C, and Receiver D. Thus, the reconfigurable intelligent surface processing gain (receive-and forwarding gain) can be increased with any increased number of allocated unit cell subarrays to improve any weaker link accordingly.

Figure 9:
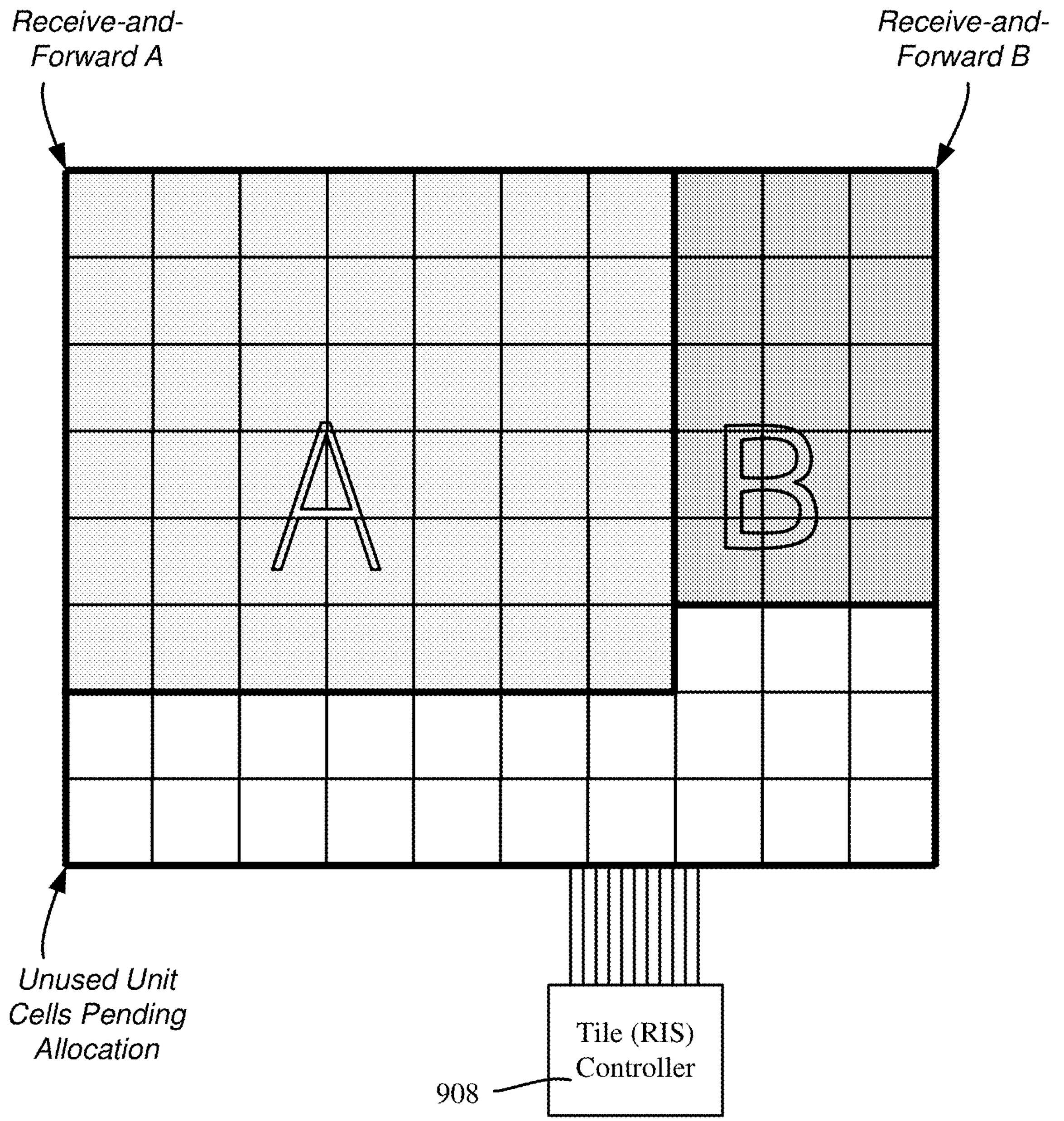
FIG. 9 is a top view representation of an example unit cell subarray allocation with two receive-and-forward portions and unallocated unit cells, in accordance with various example embodiments and implementations of the subject disclosure.

Considering potential interference introduced by a reconfigurable intelligent surface to neighbor nodes, in the event the reconfigurable intelligent surface design has some anomalies, or the interference mitigation is not appropriately considered when designing the panel (with respect to other reconfigurable intelligent surfaces and/or base stations), the base station can instruct the reconfigurable intelligent surface's tile controller 908 to not use all the subarrays of unit cells. This reduces interference to other nodes, e.g., to obtain globally optimized performance, as shown in FIG. 9. The unutilized portion can stay as such in case the lower gain is required to mitigate nearby interference, or this portion can be further allocated dynamically to serve low-gain UE/BS links. It is also feasible to use this portion to redirect signals in a direction away from the other node(s) suffering from interference, if the redirected signals in one direction are causing the interference, but not in other direction(s).

Base stations have a global view on network performance and can therefore provide useful input control information to the reconfigurable intelligent surface controller to ensure that the reconfigurable intelligent surface the controller controls is jointly optimized with other nodes (including neighbor base stations and reconfigurable intelligent surfaces). The potential interference introduced by a reconfigurable intelligent surface to neighbor nodes (other reconfigurable intelligent surface(s) or base station(s)), along with and saving power consumption in case only part of the reconfigurable intelligent surface is sufficient to improve coverage or data rate, the base station can instruct the reconfigurable intelligent surface to not use some of the unit cell subarrays to reduce interference for other nodes to get global optimized performance.

By way of example, consider an embodiment in which the total number of total number of unit cells in a reconfigurable intelligent surface panel is 2880, (20 subarrays×16 subarrays, arranged as 3×3 unit cell groupings). The control signal from the base station can indicate that number of subarrays for the receive-and-forward A is 80 (720 unit cells), the number of subarrays for the receiver-and-forward B is 50 (450 unit cells), the number of subarrays for the transmitter C is 40 (360 unit cells), and the number of subarrays for the receiver D is 41 (369 unit cells). The remaining 109 subarrays (981 unit cells) are to remain unused, unless and until the portions are reconfigured.

One embodiment is that the base station sends a control signal regarding the allocation of reconfigurable intelligent surface subarrays of unit cells to the reconfigurable intelligent surface. Another embodiment is that a UE sends a control signal regarding the allocation of the reconfigurable intelligent surface subarrays to the reconfigurable intelligent surface. The control signal can include at least two fields, including a first field that indicates the number of subarray(s) (or possibly unit-cell(s) if an appropriate multiple for a subarray) for receive-and-forward portion of the RIS, segment A, and a second field that indicates the number of subarray(s) for receive-and-forward portion, segment B. Optionally, a third field indicates the number of subarray(s) for the transmitter portion, segment C; optionally, a fourth field indicates the number of subarray(s) for the receiver portion, segment D.

In alternative, the field about number of unit cells for any of receive-and-forward portion, segment A, receive-and-forward portion, segment B, transmitter portion, segment C, and receiver portion, segment D in the control signal can be set as zero. When this occurs, the base station can control the reconfigurable intelligent surface to not perform a function. For example, when the number of unit-cell(s) for receive-and-forward portion, segment A, is set to 0, it means that the reconfigurable intelligent surface temporarily does not need to receive a signal from the BS-RIS backhaul link.

In another alternative, the number of unit-cell(s) indicated in the control signal can be a percentage of the maximum number of subarray(s) in a reconfigurable intelligent surface panel or reconfigurable intelligent surface sub-panel. For example, the number of subarray(s) for receive-and-forward portion, segment A, can be set as 50% of the maximum number of subarray(s) in a reconfigurable intelligent surface panel or reconfigurable intelligent surface sub-panel, the number of subarray(s) for receive-and-forward portion, segment B, is 25%, the number of subarray(s) for the transmitter portion, segment C, is 12.5%, the number of unit-cell(s) for the receiver portion, segment D, is 12.5%. In yet another alternative, the control signal can include the ratio of the number of unit cells/reconfigurable intelligent surface subarrays among receive-and-forward A, receive-and-forward B, Transmitter C, Receiver D, for example.

When the BS-RIS control link and RIS-UE link/BS-RIS backhaul link are working in the same frequency band and the same time slot, i.e., in full-duplexing mode, it means that receive-and-forward segment A, receive-and-forward segment B, transmitter segment C, and receiver segment D can share all subarrays of unit cells/reconfigurable intelligent surface elements in the reconfigurable intelligent surface, but use different subarrays of unit cells in the reconfigurable intelligent surface panel to avoid interference and blockage. In other words, the total number of allocated subarrays of unit cells for receive-and-forward segment A, receive-and-forward segment B, transmitter segment C, and receiver segment D are no more than the maximum number of subarrays of unit cells or reconfigurable intelligent surface elements in the reconfigurable intelligent surface as a reconfigurable intelligent surface capability.

When the BS-RIS control link and RIS-UE link/BS-RIS backhaul link are working in the same frequency band but in different time slot, i.e., time domain duplexing (TDD) mode, the BS-reconfigurable intelligent surface control link can use all of the subarrays of unit cells in the reconfigurable intelligent surface panel in a given time slot, while the RIS-UE link and BS-RIS backhaul link can use all numbers of subarrays of unit cells in the reconfigurable intelligent surface panel in another time slot. The total number of allocated unit cell subarrays for receive-and-forward segment A and receive-and-forward segment B are no more than the maximum number of subarrays of unit cells or reconfigurable intelligent surface elements in a reconfigurable intelligent surface panel as a reconfigurable intelligent surface capability; the total number of allocated subarrays of unit cells for transmitter segment C and receiver segment D are more than the maximum number of subarrays of unit cells in a reconfigurable intelligent surface panel as a reconfigurable intelligent surface capability. In this case, time slot allocation, which is associated with allocated subarrays of unit cells, can be indicated by the base station or UE. The control signal from the base station can include another field, which indicates time slot allocation for associated subarrays of unit cells allocated for receive-and-forward A and receive-and-forward segment B, or transmitter segment C and receiver segment D.

When the BS-RIS control link and RIS-UE link/BS-RIS backhaul link is working in different frequency resources, i.e., in the frequency domain duplexing (FDD) mode, the frequency allocation, which is associated with allocated subarrays of unit cells, can be indicated by the base station or UE. The control signal from the base station can include another field, which indicates frequency domain allocation for associated subarrays of unit cells allocated for receive-and-forward segment A and receive-and-forward segment B, or transmitter segment C and receiver segment D.

Another example embodiment is that the reconfigurable intelligent surface can have at least two sub-panels; one sub-panel of reconfigurable intelligent surface elements or unit cells for receiver-and-forward portion, segment A, and receive-and-forward portion, segment B, along with a second sub-panel of reconfigurable intelligent surface elements or unit cells for the transmitter portion, segment C, and receiver portion, segment D. In this case, the RIS controller reports the maximum number of subarrays, or RIS elements or unit-cells in each portion/segment/slice.

Such that the coverage issue can be improved separately for BS-RIS control link, BS-RIS backhaul link and RIS-UE link, a control signal from BS can include at least two fields; one field indicates the number of subarray(s) for receive-and-forward A, such as x subarrays; a second field indicates the number of subarray(s) for receive-and-forward B, such as y subarrays; the total number of subarray(s) for receive-and-forward A and subarray(s) for receive-and-forward B should not be more than the maximum number of subarrays in a first reconfigurable intelligent surface segment/slice. The other signal from the BS can include a field indicates the number of subarrays for transmitter C such as v subarrays; the other field indicates the number of unit-cell(s) for receiver D such as w subarrays; the total number of subarrays(s) for transmitter C and receiver D should not be more than the maximum number of subarrays in a second reconfigurable intelligent surface portion.

Figure 10A:
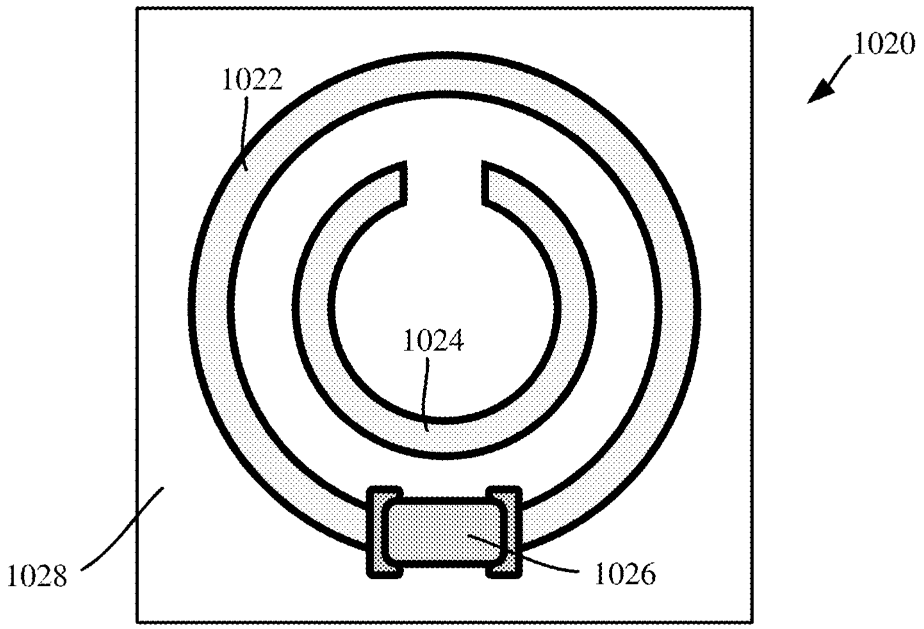
FIGS. 10A and 10B are example top view (FIG. 10A) and three-dimensional perspective view (FIG. 10B) representations of an example unit cell useable with a reconfigurable intelligent surface capable of being subdivided, in accordance with various aspects and implementations of the subject disclosure.
Figure 10B:
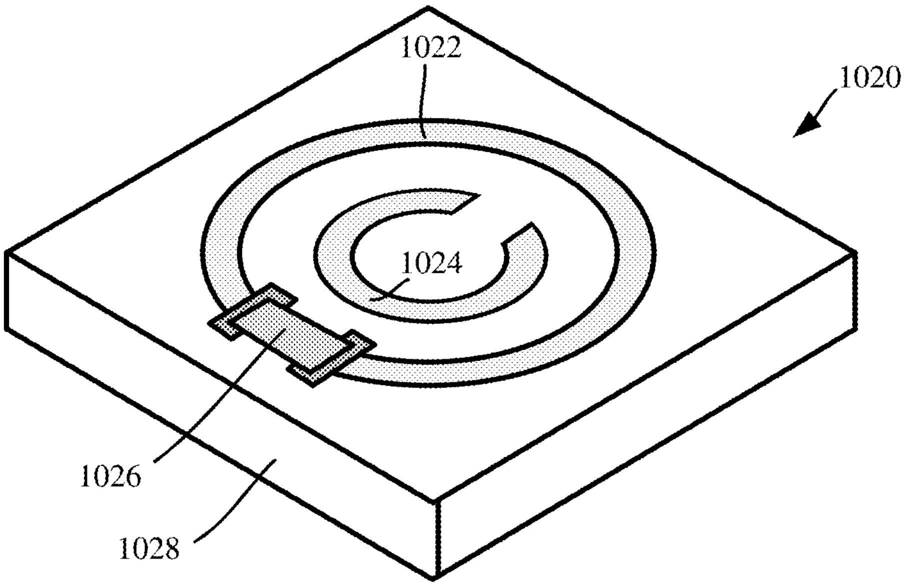

Turning to example hardware configurations, one example implementation of a RIS design is based on using unit cells having two split-ring resonators with a tunable capacitor (e.g., soldered) on the top metallization plane as shown in FIGS. 10A and 10B. As will be understood, this facilitates creation of a modular RIS. Such that the allocation and variable gain ratios can be implemented, the stack (FIG. 11) includes two low-cost substrate layers and three metallization layers, a top metallization for the RIS elements, a middle RF ground plane, and a bottom metallization layer to integrate electronics such as described herein.

More particularly, FIG. 10A shows an example design of a unit cell (or element) that is part of a module, in which a unit cell is a basic building block of the reconfigurable intelligent surface. By understanding and performing controlled adjustment of each unit cell's properties, the system can predict and manage the overall behavior of the reconfigurable intelligent surface.

In the example nonlimiting implementation shown in FIGS. 10A (top view) and 10B (three-dimensional perspective view), one design of the unit cell 1020 comprises two circular split rings 1022 and 1024. The outer ring 1022 has a tunable capacitor 1026, e.g., an integrated varactor that offers a tunable capacitance with voltage. The dimensions of these rings 1022 and 1024 can be tailored to specific operational frequency ranges for which the unit cell is designed. As is understood, shapes other than circular split rings (e.g., square, rectangular and so on) and other configurations can be used in the construction of a unit cell. These elements can be designed on metallization layer on a (e.g., low-cost) substrate 1028.

Figure 11:
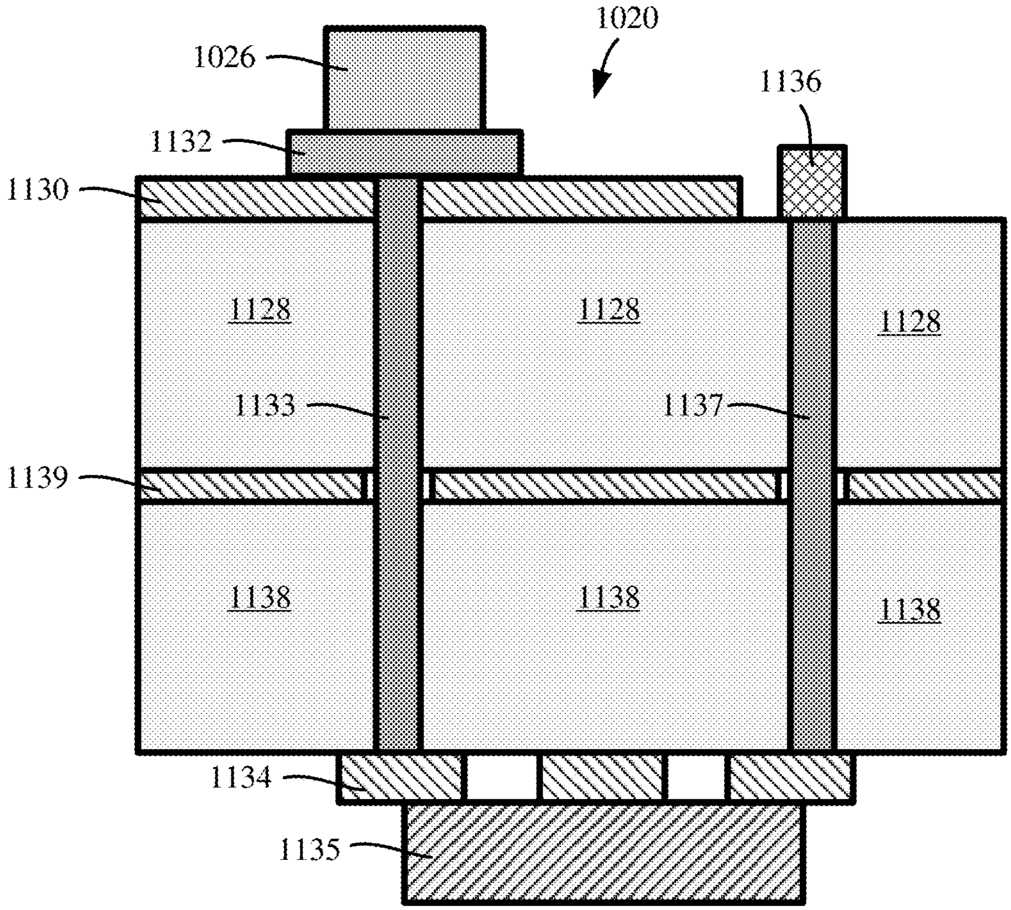
FIG. 11 is a cross-sectional view of an example unit cell useable with a reconfigurable intelligent surface capable of being subdivided, showing a stack and arrangement of fabricated layers, in accordance with various aspects and implementations of the subject disclosure.

FIG. 11 shows a cross-sectional side view of a nonlimiting fabrication layer stack and arrangement of the unit cell 1020 of FIGS. 10A and 10B. A top metallization layer 1130 is patterned on a first substrate layer 1128, e.g., corresponding to the substrate 1028 of FIGS. 10A and 10B. The unit cells/elements are designed on each cell's metallization layer 1130. The surface mounted device (SMD) tunable capacitor 1026 can be soldered on top of SMD pads 1132 atop the metallization layer 1130, with a via 1133 (e.g., for voltage control connections of the tunable capacitor 1026) to a bottom metallization layer 1134 that couples to an SMD microcontroller and power supply controller (PSU)/distribution module 1135. A RF receiver (Rx) sensor 1136 can be optionally added to provide any additional sensing capabilities, such as proximity detection. If included, the Rx receiver 1136 also can be placed on the first substrate layer 1128 with a via 1137 to the bottom metallization layer 1134/SMD microcontroller and power supply controller 1135.

The underside of the first substrate layer 1128 is separated from a second substrate layer 1138 by a metal plane 1139 acting as RF ground. Below the underside of the second substrate layer 1138 is the bottom metallization layer 1134 which is patterned to form the DC biasing and control circuitry. The controller and the PSU/power distribution module 1135 are soldered on this bottom metallization layer 1134. To ensure seamless interconnection across the multi-layered stack, the vias 1133 and 1137 are strategically positioned. For instance, the tunable capacitor 1026 (e.g., varactor) is linked to two vias (only one via is represented in the example of FIG. 3): one via (not explicitly shown) connecting its negative terminal to the ground plane 1139, while the other via 1133 links its positive terminal to the biasing on the bottom metal layer 1134.

Figure 12A:
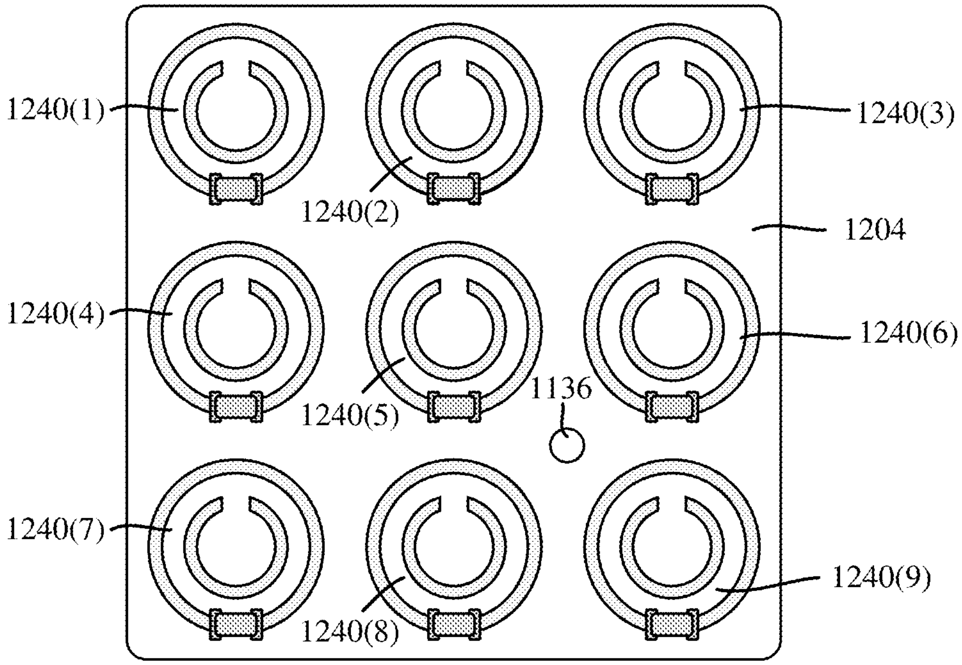
FIGS. 12A and 12B are front and back views, respectively, of an example 3×3 subarray of unit cells of a module, useable with a reconfigurable intelligent surface capable of being subdivided, in accordance with various aspects and implementations of the subject disclosure.
Figure 12B:
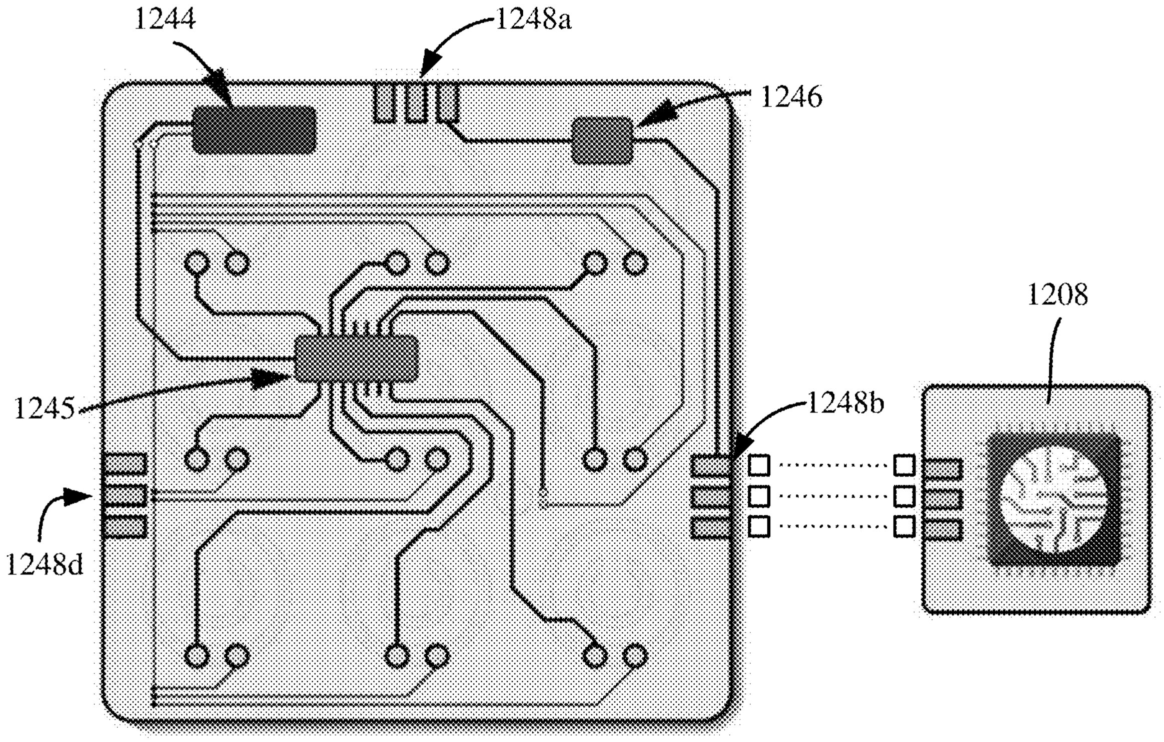
Figure 13:
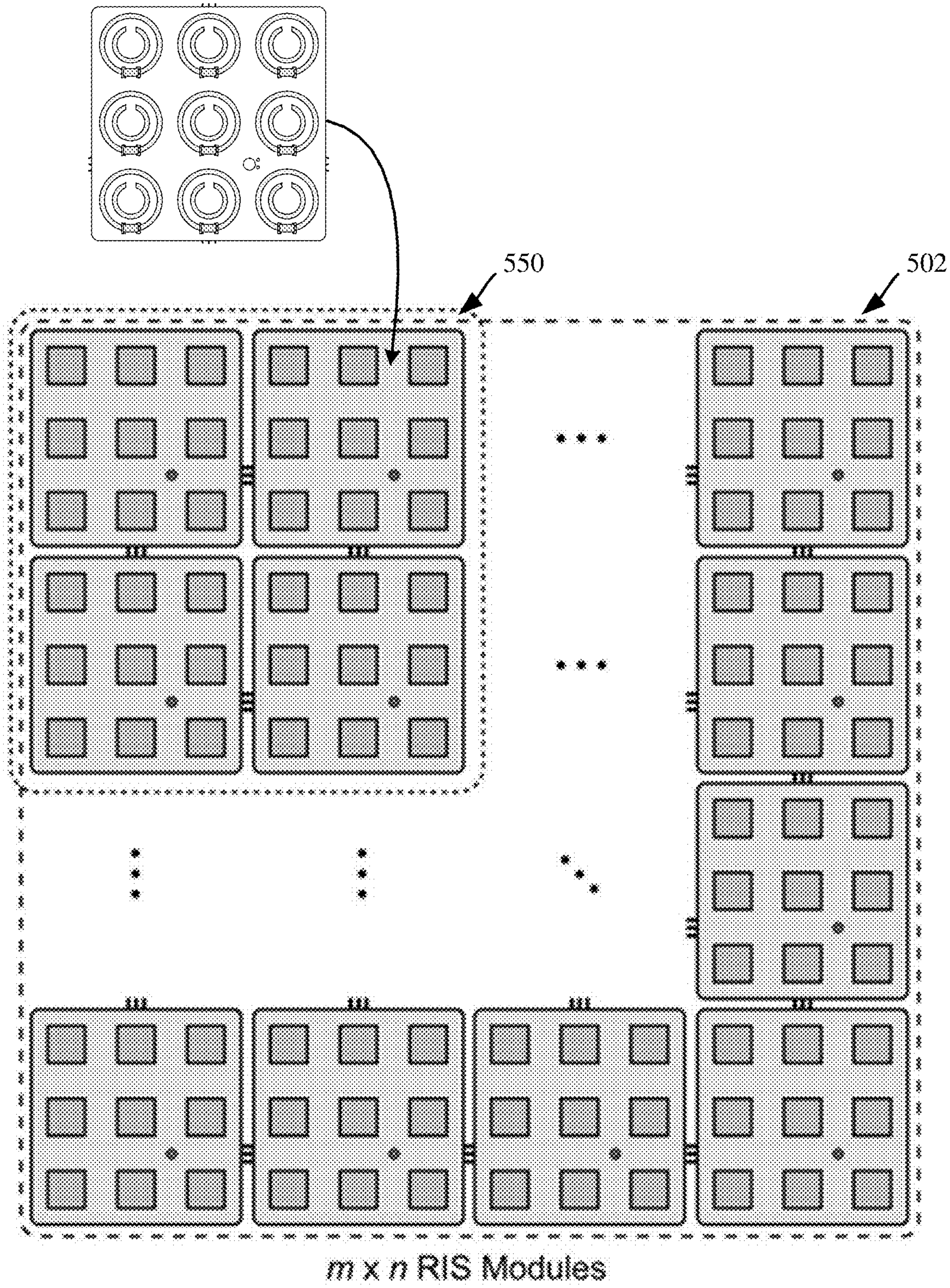
FIG. 13 is a representation of example modules that can be connected together to form a higher order m×n reconfigurable intelligent surface array, in accordance with various aspects and implementations of the subject disclosure.

FIG. 12A shows the concept of 3×3 module with 9 unit-cells. FIG. 12B shows the rear side of the module highlighting various components. One modular design is proposed with magnetic contact points to facilitate adding or removing a certain number of modules and to connect the tile controller as shown in FIG. 13.

Each module can include a low-cost embedded microcontroller, module position detector, and a power distribution module. The digital signal flow, which can be through the magnetic alignment connector, is synced and timed using a clock circuit of the tile controller.

More particularly, FIG. 12A shows a front view of an example 3×3 subarray of nine unit cells 1240(1)-1240(9) combined on a module 1204. Although a 3×3 array of unit cells per module are generally used in the examples herein, this is a nonlimiting example, and an array can be composed of j×k unit cells, where j and k are any practical numbers; (typically j=k, but this is not a requirement).

The element (unit cell) designs along with the surface mount devices (SMDs) such as varactors (not individually labeled) and the optional receiver sensor 1136 can be seen on the front side view of FIG. 12A. The power distribution module 1244, microcontroller 1245 and synchronization (sync) module 1246 and the metal traces (not separately labeled) providing the voltages to the nine varactors, along with the coupling terminals 1248 can be seen on the back side view in FIG. 12B of the module 1204.

Significantly, multiple of these modules can be coupled together to form a higher order array (as shown in FIG. 13 for example, any of which can be a slice), using the coupling terminals 1248*a*-1248*d* (FIG. 12B), shown on each side of the module of FIG. 12B so that any vertically or horizontally adjacent module can be coupled thereto. Note that FIG. 12B omits depicting the coupling terminals 1248*c* so as to avoid implying that they are electrically coupled to the varactor ground traces. The coupling terminals (collectively) 1248 can be made of magnetic metals to facilitate both physical and electrical coupling, including to other modules and to the RIS controller.

The directivity provided to the reflected signal can be dynamically adjusted as described herein. Synchronization between the modules is maintained by using a primary modular controller 1212 and the sync module instance (e.g., 1246 FIG. 12B) on each module. Because the magnetic coupling and sync terminals are present on the modules, the primary modular controller 1212 can be attached to any one module on the outer periphery of the reconfigurable intelligent surface aperture.

As described herein, the tile controller 1208 provides instructions to the microcontrollers behind each module (e.g., the microcontroller 1245 of FIG. 12B). For example, based on the requested directivity (gain and/or direction) of a certain link e.g., BS-RIS, UE-RIS and so forth, the number of unit cells information is reported to the BS, and the phase profile is computed by the tile controller 1208 to intelligently allocate the number of modules required to fulfill the request.

The direction of the reflected signal from the active aperture arrays of the reconfigurable intelligent surface is dictated by a phase profile over the reconfigurable intelligent surface. The phase profile corresponds to how much phase shift each element in reconfigurable intelligent surface presents such that the phase shifts combine to reflect the incoming signal in the desired direction along with a certain gain. Closed-form equations can be used to determine the phase profiles for the expected reflected angle direction and gain for any a m xn reconfigurable intelligent surface array.

To change the phase shifts of each module's elements, the microcontroller, as directed by the tile controller, alters the voltage distributed to each of the varactors, which switches the varactors of the elements between capacitance states. As described above, the varactors can be surface mounted/soldered on the top surface with two vias per varactor to connect the diodes to the ground and the bottom layer, respectively.

Figure 14A:
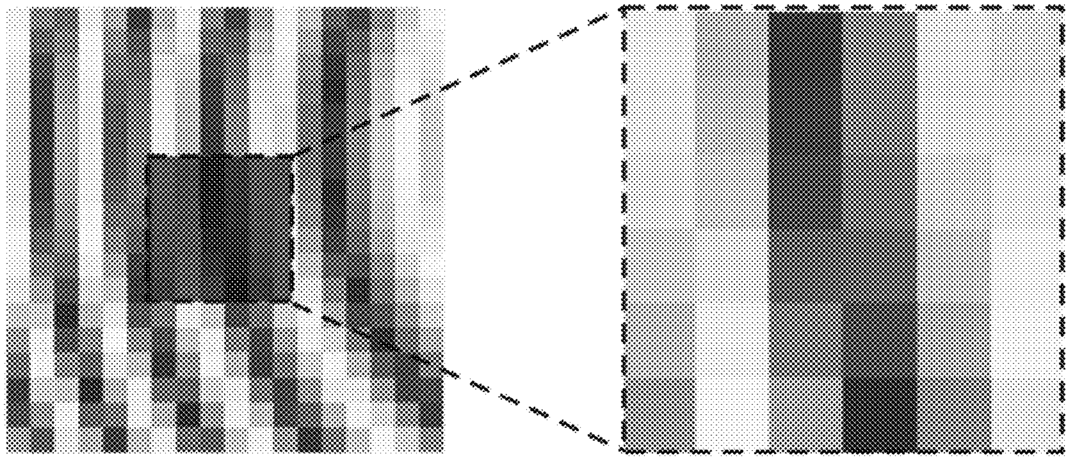
FIG. 14A is a representation of example phase profiles of 18×18 elements and 6×6 elements (zoomed-in) of a reconfigurable intelligent surface, in accordance with various aspects and implementations of the subject disclosure.

The simulation of the phase profile is shown in FIG. 14A for two different RIS array sizes (18×18 and 6×6). The phase profile is superimposed on the subpanel (FIG. 14B) and the simulation of the beamforming (FIG. 14C) shows change in directivity. Based on the allocation and superimposing of the phase profile for the links Receive-and-Forward A, Receive-and-Forward B, Transmitter Segment C, Receiver Segment D, and a module section pending allocation is shown in the subdivided RIS 1502 of FIG. 15.

Figure 14B:
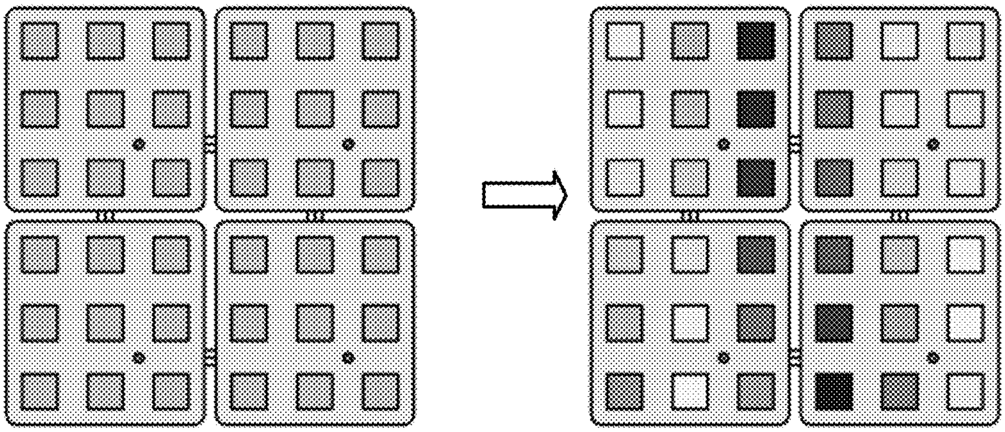
FIGS. 14B and 14C are representations of an example pre-configuration and post-configuration of 36-element modules (FIG. 13B) and corresponding example pre-configuration and post-configuration beam reflection directions (FIG. 13C), in accordance with various aspects and implementations of the subject disclosure.
Figure 14C:
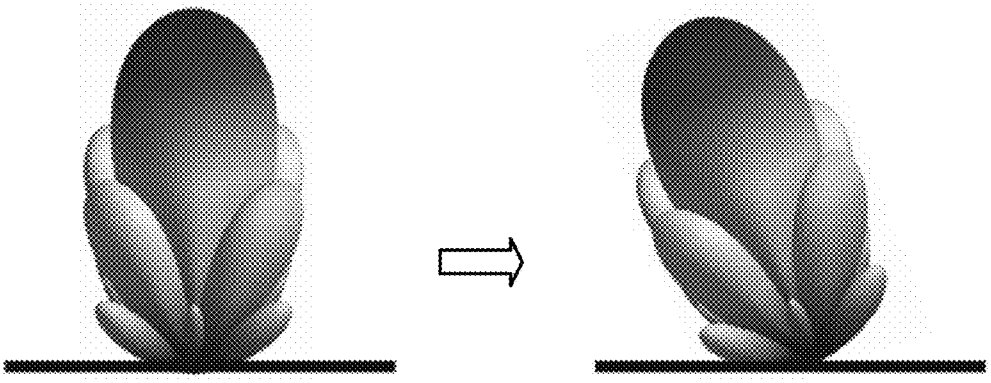
Figure 15:
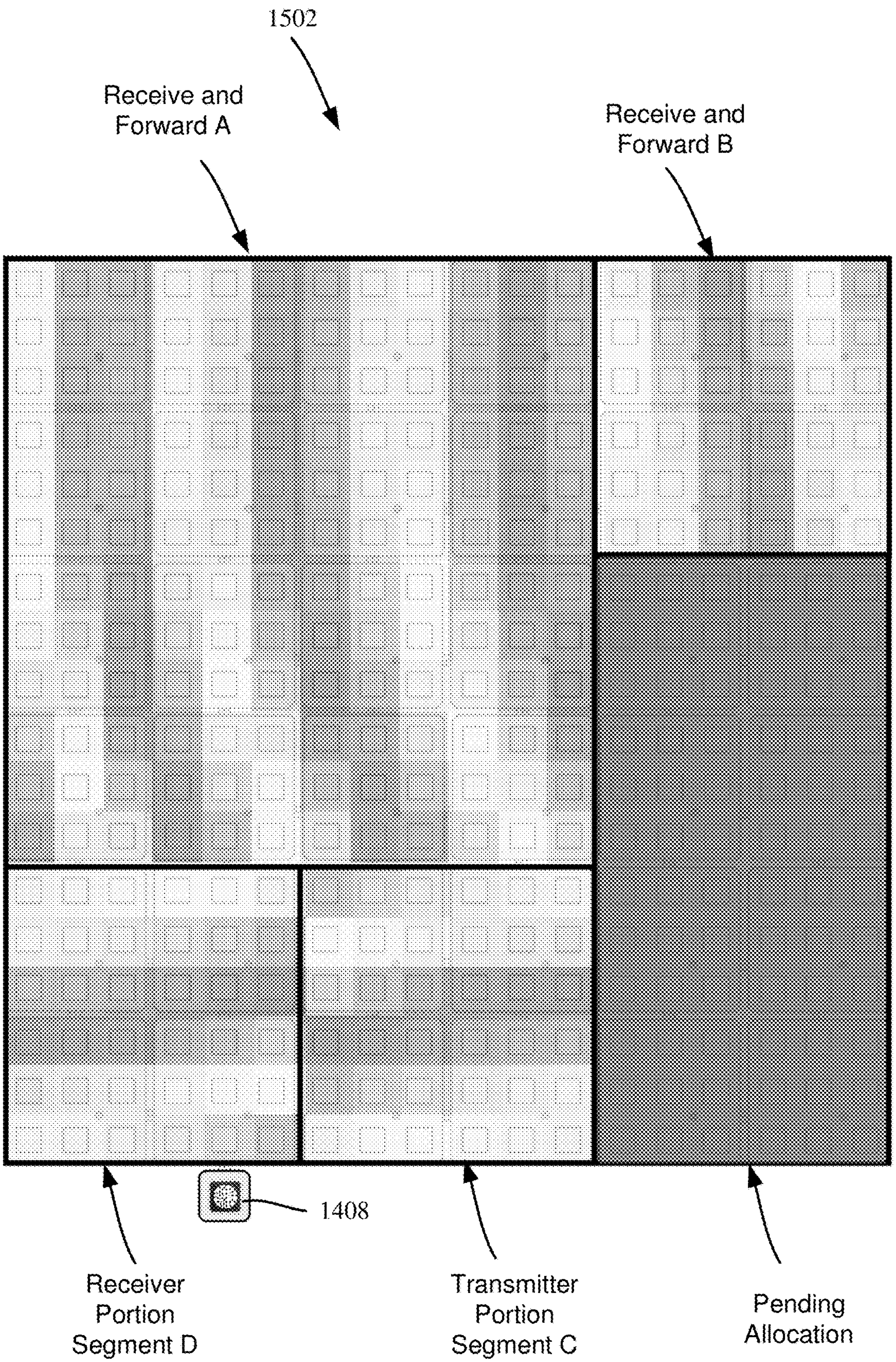
FIG. 15 is a representation of an example allocation of portions of a reconfigurable intelligent surface for various links, as controlled by a magnetically attached tile controller, in accordance with various aspects and implementations of the subject disclosure.
Figure 16A:
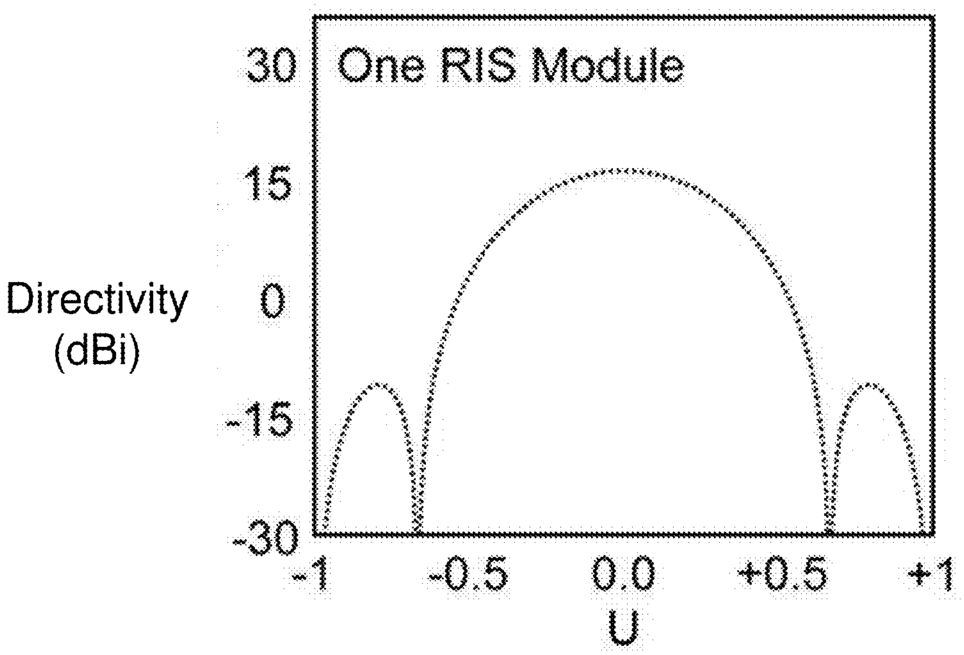
FIG. 16A is an example directivity diagram showing the signal gain and main lobe corresponding to one reconfigurable intelligent surface module (a 3×3 array of unit cells), in accordance with various aspects and implementations of the subject disclosure.
Figure 16B:
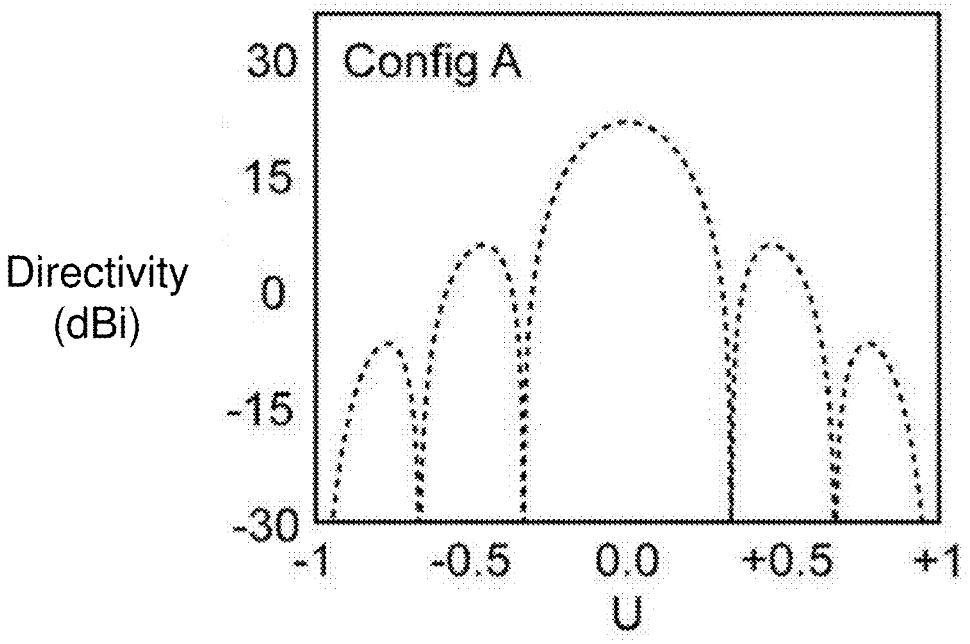
FIG. 16B is an example directivity diagram showing the signal gain and main lobe corresponding to one reconfigurable intelligent surface configuration (a 6×6 array), in accordance with various aspects and implementations of the subject disclosure.
Figure 17A:
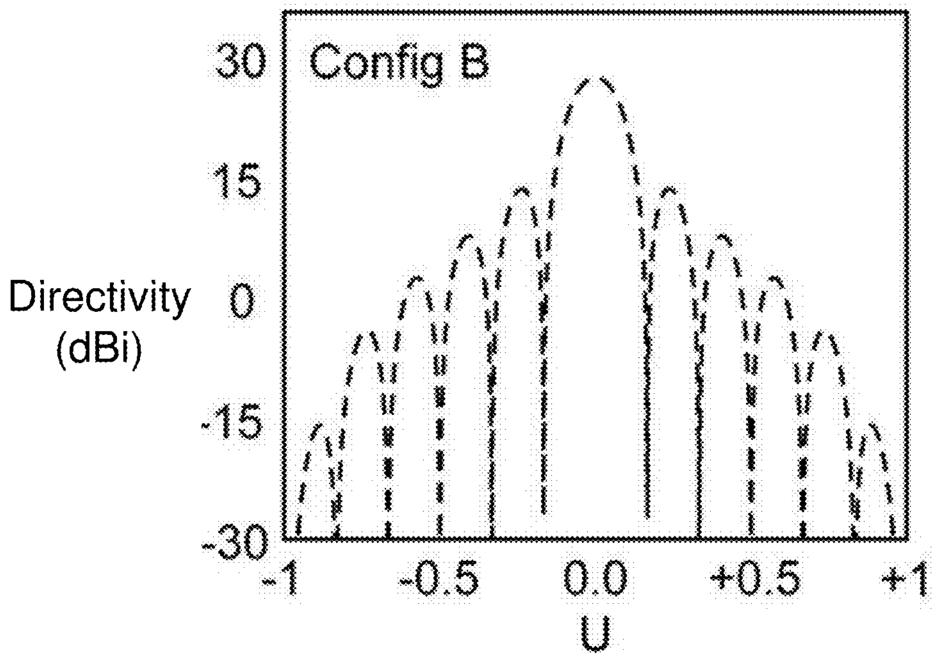
FIG. 17A is an example directivity diagram showing the signal gain and main lobe corresponding to another reconfigurable intelligent surface configuration (a 12×12 array), in accordance with various aspects and implementations of the subject disclosure.
Figure 17B:
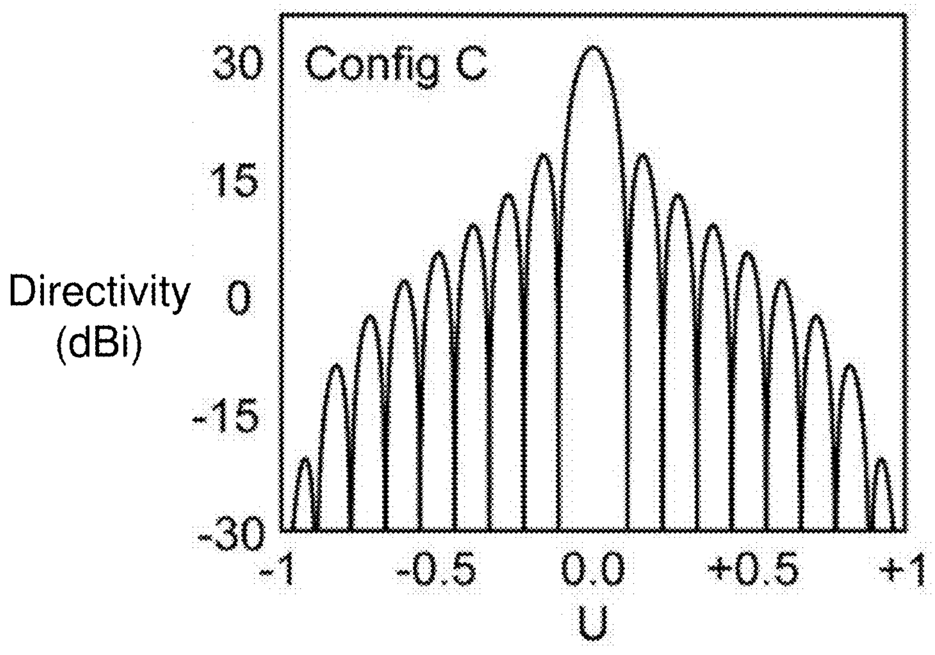
FIG. 17B is an example directivity diagram showing the signal gain and main lobe corresponding to yet another reconfigurable intelligent surface configuration (an 18×18 array), in accordance with various aspects and implementations of the subject disclosure.

More particularly, FIGS. 14A-14C show the phase profile for an 18×18 array reconfigurable intelligent surface corresponding to the reflected signal direction $\theta=20°$ (polar angle) and $\varphi=5°$ (azimuth angle). A smaller section (a 6×6 array, on the right side of FIG. 14A) from this phase profile provides the reflected signal with reduced signal gain. This phase profile is reflected on the 6×6 reconfigurable intelligent surface array in terms of voltage provided to the varactors. The reconfigurable intelligent surface panel is pre-configured to reflect in the direction $\theta=0°$ and $\varphi=0°$, and then can be reconfigured remotely in the desired direction ($\theta=20°$ and $\varphi=5°$) based on the IR instruction code sent remotely from IR transmitter. FIG. 14B represents the preconfigured and post-signal-configured states of a 2×2 array of the modules, and FIG. 14C shows the beam directions in the respective preconfigured and post-signal-configured states.

The scaling of one RIS module, and three different configurations of the RIS (described with reference to FIG. 13), and the simulated directivity of different RIS modules with three different configurations is shown in FIGS. 16A, 16B, 17A and 17B.

Figure 18:
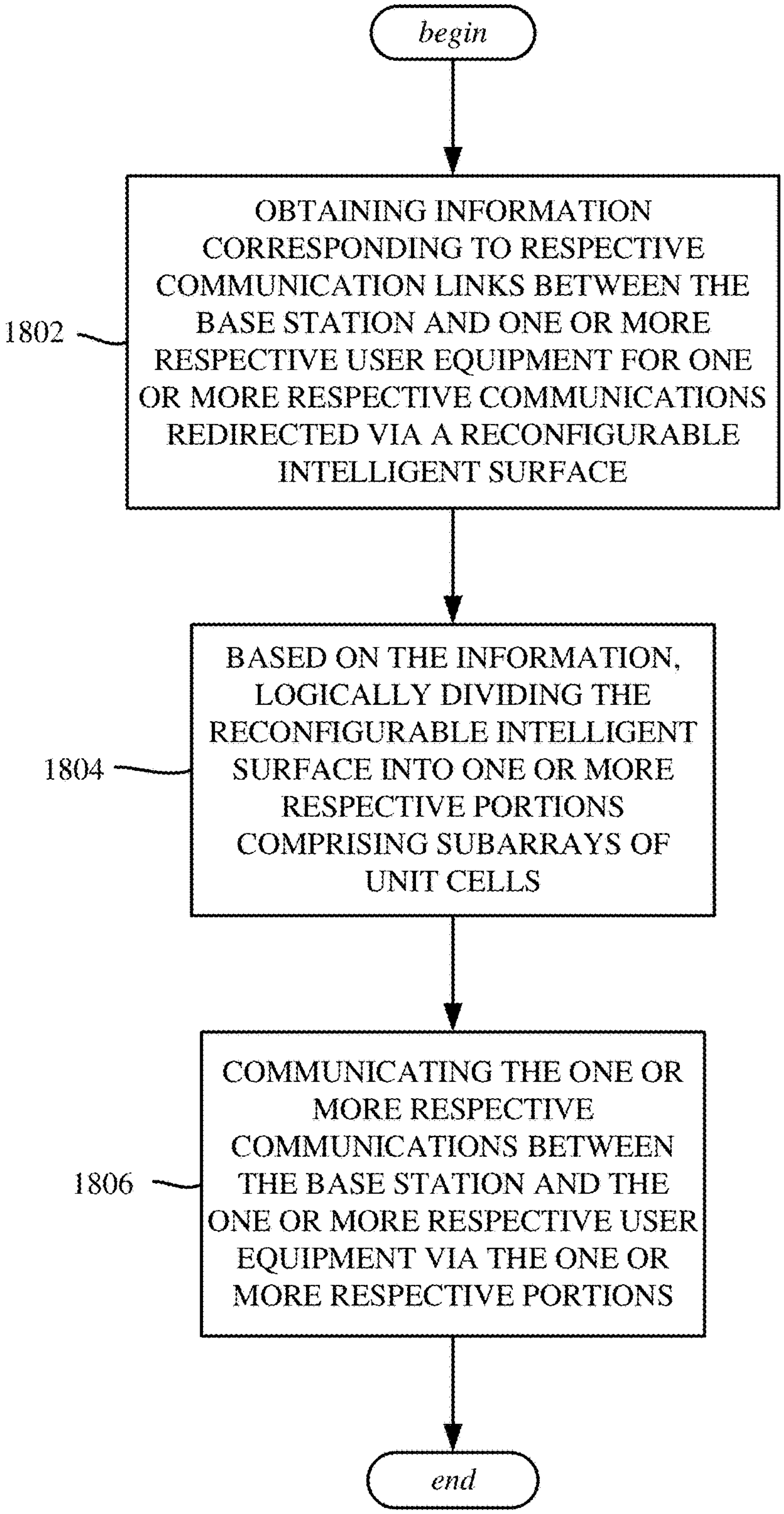
FIG. 18 is a flow diagram showing example operations related to communicating respective communications between a base station and the one or more respective user equipment via respective portions of a RIS that include subarrays of unit cells, in accordance with various example embodiments and implementations of the subject disclosure.

One or more concepts described herein can be embodied in a system, such as represented in the example operations of FIG. 18, and for example can include at least one memory that stores computer executable components and/or operations, and at least one processor that executes computer executable components and/or operations stored in the memory. Example operations can include operation 1802, which represents obtaining information corresponding to respective communication links between the base station and one or more respective user equipment for one or more respective communications redirected via a reconfigurable intelligent surface. Example operation 1804 represents, based on the information, logically dividing the reconfigurable intelligent surface into one or more respective portions that can include subarrays of unit cells. Example operation 1806 represents communicating the one or more respective communications between the base station and the one or more respective user equipment via the one or more respective portions.

Logically dividing the reconfigurable intelligent surface into the one or more respective portions can include sending control signal data to a controller, coupled to the reconfigurable intelligent surface, to configure the one or more respective portions. The information can be first information, the control signal data can be first control signal data, wherein the one or more respective portions can be configured as one or more first respective portions that can include first separate rectangular groupings of unit cells, and further operations can include obtaining second information corresponding to respective second communication links, and based on the second information, logically dividing the reconfigurable intelligent surface into one or more second respective portions, which can include sending second control signal data to the controller to reconfigure the one or more first respective portions into the one or more second respective portions. The subarrays can be configured as respective modules comprising coupling terminals usable to couple to one another to form the reconfigurable intelligent surface.

The subarrays can be respective subarrays of respective unit cells, the respective subarrays can include respective microcontrollers coupled to the controller, and the respective microcontrollers can control respective phase shifts of respective tunable capacitive devices of the respective unit cells. The respective tunable capacitive devices can include respective varactors that are voltage-adjustable for control of the respective phase shifts of the respective unit cells.

The information corresponding to the respective communication links can include at least one of: first directivity data representative of a first directivity associated with a first communication link of the respective communication links, or first array gain data representative of a first array gain associated with the first communication link, and at least one of: second directivity data representative of a second directivity associated with a second communication link of the respective communication links, or second array gain data representative of a second array gain associated with the second communication link.

Logically dividing the reconfigurable intelligent surface into the one or more respective portions can include reserving a first portion of the one or more respective portions for an uplink communication link of the respective communication links for uplink communication to the base station from a user equipment of the one or more respective user equipment, and reserving a second portion of the one or more respective portions for a downlink communication link of the respective communication links for downlink communication from the base station to the user equipment of the one or more respective user equipment.

Logically dividing the reconfigurable intelligent surface into the one or more respective portions can include reserving a first respective portion of the one or more respective portions for communication of uplink control information from the base station to at least one controller that controls the reconfigurable intelligent surface, and reserving a second respective portion of the one or more respective portions for communication of downlink control information from the at least one controller that controls the reconfigurable intelligent surface to the base station.

Further operations can include reserving a respective portion of the one or more respective portions as inactive with respect to redirecting any communications.

Figure 19:
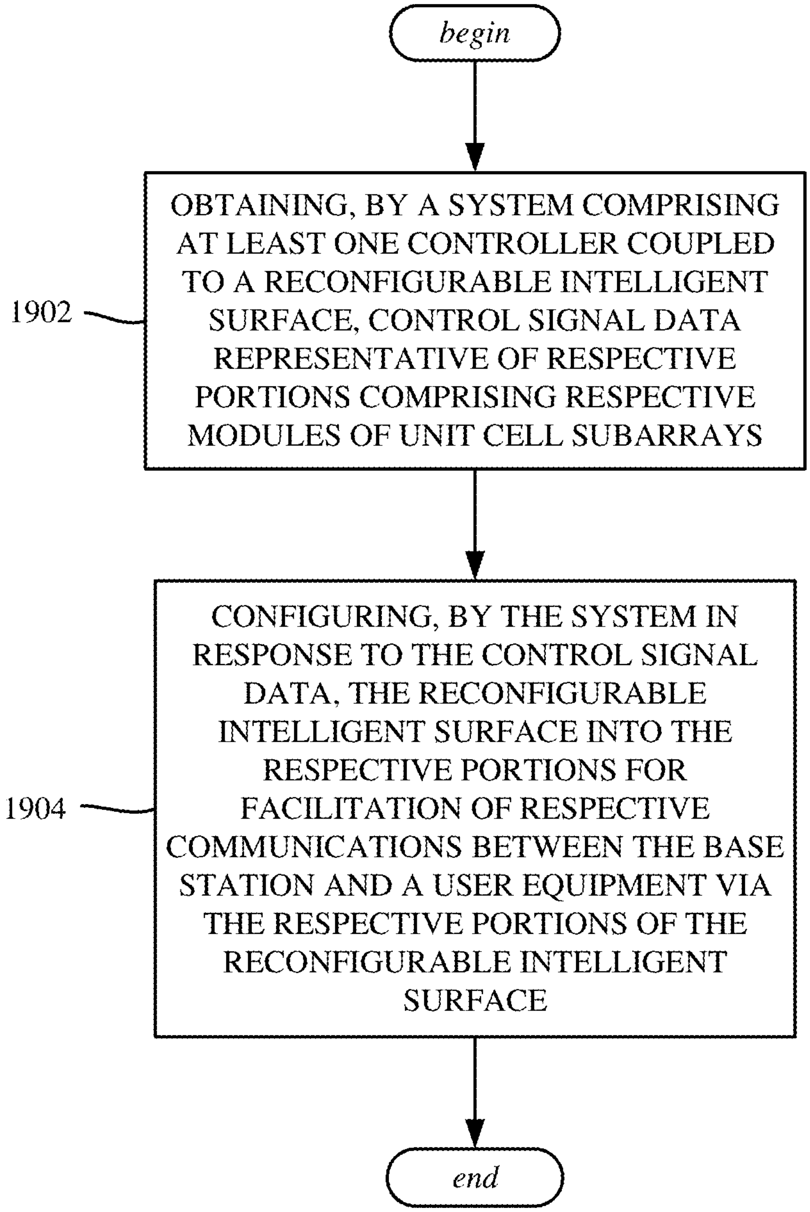
FIG. 19 is a flow diagram showing example operations related to configuring a RIS, based on control signal data, into respective potions that include unit cell subarrays for facilitation of respective communications between a base station and a user equipment via the respective subarrays of the RIS, in accordance with various example embodiments and implementations of the subject disclosure.

One or more example implementations and embodiments, such as corresponding to example operations of a method, are represented in FIG. 19. Example operation 1902 represents obtaining, by a system including at least one controller coupled to a reconfigurable intelligent surface, control signal data representative of respective portions comprising respective modules of unit cell subarrays. Example operation 1904 represents configuring, by the system in response to the control signal data, the reconfigurable intelligent surface into the respective portions for facilitation of respective communications between the base station and a user equipment via the respective portions of the reconfigurable intelligent surface.

Configuring the reconfigurable intelligent surface into the respective portions can include configuring a first portion of the respective portions for reception of downlink communications from the base station and redirection of the downlink communications to the user equipment, and configuring a second portion of the respective portions for reception of uplink communications from the user equipment and redirection of the uplink communications to the base station.

The downlink communications can be first downlink communications, the uplink communications can be first uplink communications, the user equipment can be a first user equipment corresponding to a first direction, and configuring the reconfigurable intelligent surface into the respective portions can include configuring a third portion of the respective portions for reception of second downlink communications from the base station and redirection of the downlink communications to a second user equipment corresponding to a second direction, and configuring a fourth portion of the respective portions for reception of second uplink communications from the second user equipment and redirection of the second uplink communications to the base station.

Configuring the reconfigurable intelligent surface into the respective portions can include configuring a first portion of the respective portions and a second portion of the respective portions, in which the first portion can include first respective modules having a larger number of modules relative to a lesser number of modules of second respective modules of the second portion.

Configuring the reconfigurable intelligent surface into the respective portions can include configuring a first portion of the respective portions for reception of first control link communications from the base station to the controller, and configuring a second portion of the respective portions for transmission of second control link communications from the controller to the base station.

The control signal data can include first control signal data, the respective portions can be first respective portions, the respective modules of unit cell subarrays can be first respective modules, the respective communications can be first respective communications, and further operations can include obtaining, by the system, second control signal data representative of second respective portions comprising second respective modules of unit cell subarrays, and, in response to the second control signal data, reconfiguring, by the system, the reconfigurable intelligent surface into second respective portions for facilitation of second respective communications between the base station and the user equipment via the second respective portions.

Figure 20:
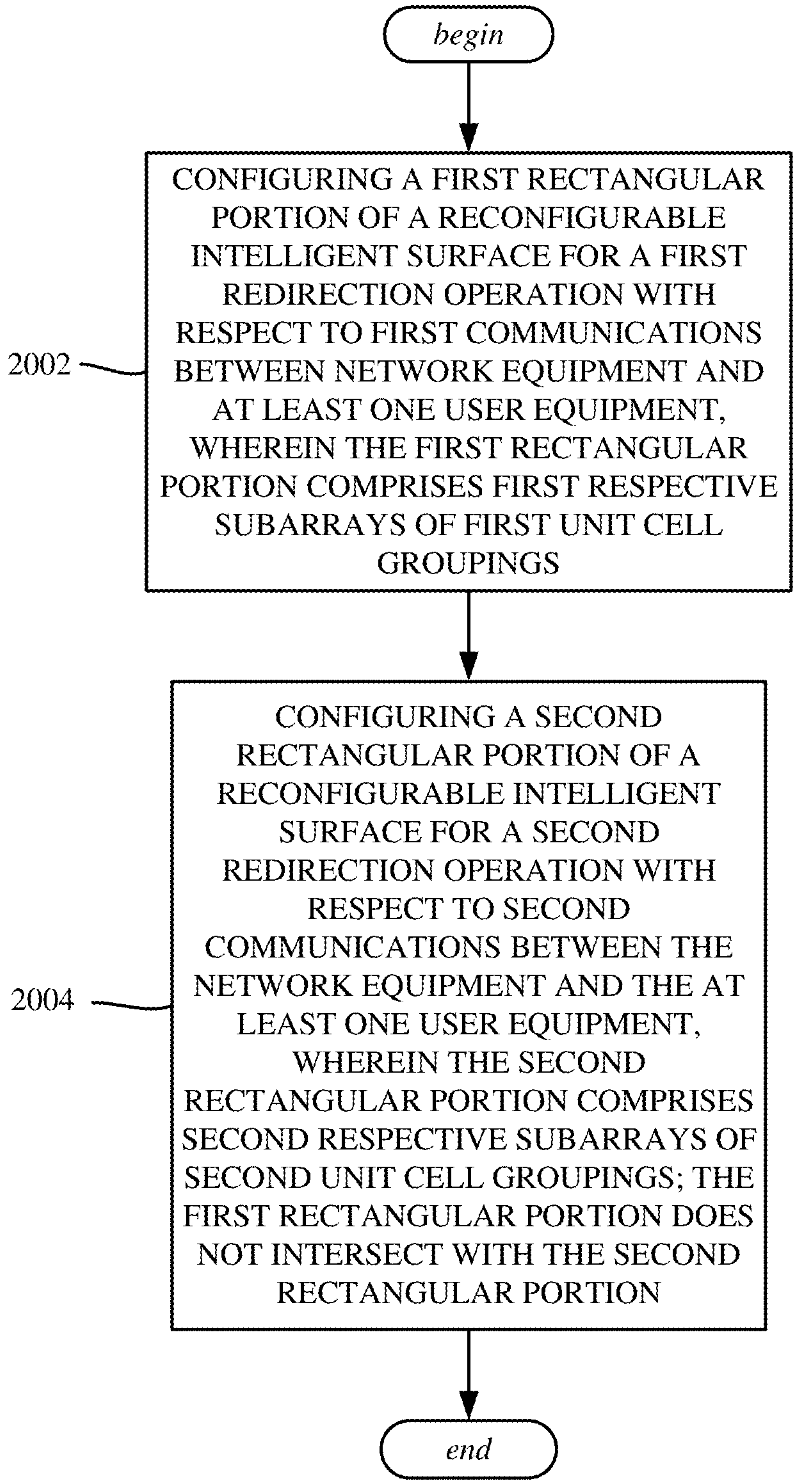
FIG. 20 is a flow diagram showing example operations related to configuring first and second rectangular portions that include subarrays of unit cells of a RIS, for first and second redirection operations with respect to first and second communications between network equipment and at least one user equipment, in accordance with various example embodiments and implementations of the subject disclosure.

FIG. 20 summarizes various example operations, e.g., corresponding to a machine-readable medium, including executable instructions that, when executed by at least one controller, facilitate performance of operations. Example operation 2002 represents configuring a first rectangular portion of a reconfigurable intelligent surface for a first redirection operation with respect to first communications between network equipment and at least one user equipment, wherein the first rectangular portion can include first respective subarrays of first unit cell groupings. Example operation 2004 represents configuring a second rectangular portion of a reconfigurable intelligent surface for a second redirection operation with respect to second communications between the network equipment and the at least one user equipment, wherein the second rectangular portion can include second respective subarrays of second unit cell groupings. The first rectangular portion does not intersect with the second rectangular portion.

Configuring the first rectangular portion for the first redirection operation can include controlling the first respective subarrays to reflect the first communications with at least one of: a first specified beam reflection direction, or a first specified beam gain, and wherein the configuring of the second rectangular portion for the second redirection operation can include controlling the second respective subarrays to reflect the second communications with at least one of: a second specified beam reflection direction, or a second specified beam gain.

Further operations can include configuring a third rectangular portion of the reconfigurable intelligent surface for control communications between the network equipment and the at least one controller; the third rectangular portion can include third respective subarrays of third unit cell groupings, and the third rectangular portion does not intersect with the first rectangular portion or the second rectangular portion.

Configuring the first rectangular portion can include configuring the first respective subarrays for the first communications between the network equipment and the at least one user equipment at a first location, wherein the configuring of the second rectangular portion can include configuring the second respective subarrays for the second communications between the network equipment and the at least one user equipment at a second location, and wherein the first location is different from the second location.

As can be seen, the technology described herein is directed to an intelligent reconfigurable surface that can be reconfigured with different portions (or segments/slices), each portion being composed of subarrays of unit cell groupings, to consistently deliver robust coverage under evolving environmental conditions. The reconfiguration can be dynamic, such as to improve coverage with respect to a weaker communications link by allocating more unit cells for communications with that link. The subarrays can be modular to facilitate constructing a RIS of a desired size.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining information corresponding to respective communication links between the base station and one or more respective user equipment for one or more respective communications redirected via a reconfigurable intelligent surface;

based on the information, logically dividing the reconfigurable intelligent surface into one or more respective portions comprising respective subarrays of respective unit cells, wherein the logically dividing of the reconfigurable intelligent surface into the one or more respective portions comprises sending control signal data to a controller, coupled to the reconfigurable intelligent surface, to configure the one or more respective portions, wherein the respective subarrays comprise respective microcontrollers coupled to the controller, and wherein the respective microcontrollers control respective phase shifts of respective tunable capacitive devices of the respective unit cells; and communicating the one or more respective communications between the base station and the one or more respective user equipment via the one or more respective portions.

2. The system of claim 1, wherein the information is first information, wherein the control signal data is first control signal data, wherein the one or more respective portions are configured as one or more first respective portions comprising first separate rectangular groupings of unit cells, and wherein the operations further comprise obtaining second information corresponding to respective second communication links, and based on the second information, logically dividing the reconfigurable intelligent surface into one or more second respective portions, comprising sending second control signal data to the controller to reconfigure the one or more first respective portions into the one or more second respective portions.

3. The system of claim 1, wherein the respective subarrays are configured as respective modules comprising coupling terminals usable to couple to one another to form the reconfigurable intelligent surface.

4. The system of claim 1, wherein the respective tunable capacitive devices comprise respective varactors that are voltage-adjustable for control of the respective phase shifts of the respective unit cells.

5. The system of claim 1, wherein the information corresponding to the respective communication links comprises at least one of: first directivity data representative of a first directivity associated with a first communication link of the respective communication links, or first array gain data representative of a first array gain associated with the first communication link, and at least one of: second directivity data representative of a second directivity associated with a second communication link of the respective communication links, or second array gain data representative of a second array gain associated with the second communication link.

6. The system of claim 1, wherein the operations further comprise reserving a respective portion of the one or more respective portions as inactive with respect to redirecting any communications.

7. A method comprising, obtaining, by a system comprising at least one controller coupled to a reconfigurable intelligent surface, first control signal data representative of first respective portions comprising first respective modules of unit cell subarrays;

configuring, by the system in response to the first control signal data, the reconfigurable intelligent surface into the first respective portions for facilitation of first respective communications between the base station and a user equipment via the first respective portions of the reconfigurable intelligent surface, wherein the configuring of the reconfigurable intelligent surface into the first respective portions comprises reserving a first portion of the first respective portions for a downlink communication link of the first respective communications for downlink communications from the base station to the user equipment, and reserving a second portion of the first respective portions for an uplink communication link of the first respective communications for uplink communications to the base station from the user equipment; obtaining, by the system, second control signal data representative of second respective portions comprising second respective modules of unit cell subarrays; and in response to the second control signal data, reconfiguring, by the system, the reconfigurable intelligent surface into second respective portions for facilitation of second respective communications between the base station and the user equipment via the second respective portions.

8. The method of claim 7, wherein the configuring of the reconfigurable intelligent surface into the respective portions further comprises configuring the first portion of the first respective portions for reception of the downlink communications from the base station and redirection of the downlink communications to the user equipment, and configuring the second portion of the first respective portions for reception of the uplink communications from the user equipment and redirection of the uplink communications to the base station.

9. The method of claim 8, wherein the downlink communications are first downlink communications, wherein the uplink communications are first uplink communications, wherein the user equipment is a first user equipment corresponding to a first direction, and wherein the configuring of the reconfigurable intelligent surface into the first respective portions comprises configuring a third portion of the first respective portions for reception of second downlink communications from the base station and redirection of the downlink communications to a second user equipment corresponding to a second direction, and configuring a fourth portion of the first respective portions for reception of second uplink communications from the second user equipment and redirection of the second uplink communications to the base station.

10. The method of claim 7, wherein the configuring of the reconfigurable intelligent surface into the respective portions comprises configuring a first portion of the respective portions and a second portion of the respective portions, and wherein the first portion comprises the first respective modules having a larger number of modules relative to a lesser number of modules of the second respective modules of the second portion.

11. The method of claim 7, wherein the configuring of the reconfigurable intelligent surface into the first respective portions comprises configuring a third first portion of the first respective portions for reception of first control link communications from the base station to the controller, and configuring a fourth second portion of the first respective portions for transmission of second control link communications from the controller to the base station.

12. The method of claim 7, wherein the control signal data is first control signal data, wherein the respective portions comprising respective modules of unit cell subarrays are first respective portions comprising first respective modules of first unit cell subarrays, and wherein the operations further comprise:

obtaining, by a system comprising at least one controller coupled to a reconfigurable intelligent surface, second control signal data representative of second respective portions comprising second respective modules of second unit cell subarrays.

13. A non-transitory machine-readable medium, comprising executable instructions that, when executed by at least one controller, facilitate performance of operations, the operations comprising:

configuring a first rectangular portion of a reconfigurable intelligent surface for a first redirection operation with respect to first communications between network equipment and at least one user equipment, wherein the first rectangular portion comprises first respective subarrays of first unit cell groupings, and wherein the configuring of the first rectangular portion of the reconfigurable intelligent surface for the first redirection operation comprises reserving a first portion of one or more respective portions for communication of uplink control information from the network equipment to at least one controller that controls the reconfigurable intelligent surface; and configuring a second rectangular portion of a reconfigurable intelligent surface for a second redirection operation with respect to second communications between the network equipment and the at least one user equipment, wherein the second rectangular portion comprises second respective subarrays of second unit cell groupings, wherein the configuring of the second rectangular portion of the reconfigurable intelligent surface for the second redirection operation comprises reserving a second portion of the one or more respective portions for communication of downlink control information from the at least one controller to the network equipment, and wherein the first rectangular portion does not intersect with the second rectangular portion.

14. The non-transitory machine-readable medium of claim 13, wherein the configuring of the first rectangular portion for the first redirection operation further comprises controlling the first respective subarrays to reflect the first communications with at least one of: a first specified beam reflection direction, or a first specified beam gain, and wherein the configuring of the second rectangular portion for the second redirection operation comprises controlling the second respective subarrays to reflect the second communications with at least one of: a second specified beam reflection direction, or a second specified beam gain.

15. The non-transitory machine-readable medium of claim 13, wherein the operations further comprise configuring a third rectangular portion of the reconfigurable intelligent surface for control communications between the network equipment and the at least one controller, wherein the third rectangular portion comprises third respective subarrays of third unit cell groupings, and wherein the third rectangular portion does not intersect with the first rectangular portion or the second rectangular portion.

16. The non-transitory machine-readable medium of claim 13, wherein the configuring of the first rectangular portion further comprises configuring the first respective subarrays for the first communications between the network equipment and the at least one user equipment at a first location, wherein the configuring of the second rectangular portion further comprises configuring the second respective subarrays for the second communications between the network equipment and the at least one user equipment at a second location, and wherein the first location is different from the second location.

17. The non-transitory machine-readable medium of claim 13, wherein the first respective subarrays are configured as first respective modules comprising first coupling terminals usable to couple to one another to form a first part of the reconfigurable intelligent surface, and wherein the second respective subarrays are configured as second respective modules comprising second coupling terminals usable to couple to one another to form a second part of the reconfigurable intelligent surface.

18. The non-transitory machine-readable medium of claim 13, wherein the first respective subarrays comprise first respective microcontrollers coupled to the at least one controller, wherein the first respective microcontrollers control first respective phase shifts of first respective tunable capacitive devices, and wherein the first respective tunable capacitive devices comprise first respective varactors that are voltage-adjustable for control of the first respective phase shifts.

19. The non-transitory machine-readable medium of claim 18, wherein the second respective subarrays comprise second respective microcontrollers coupled to the at least one controller, and wherein the second respective microcontrollers control second respective phase shifts of second respective tunable capacitive devices.

20. The non-transitory machine-readable medium of claim 19, wherein the second respective tunable capacitive devices comprise second respective varactors that are voltage-adjustable for control of the second respective phase shifts.

* * * * *